US009533663B2

(12) United States Patent
Miyazaki et al.

(10) Patent No.: US 9,533,663 B2
(45) Date of Patent: Jan. 3, 2017

(54) HYDRAULIC BRAKE SYSTEM

(75) Inventors: Tetsuya Miyazaki, Toyota (JP);
Takayuki Yamamoto, Aichi-gun (JP);
Yoshito Tanaka, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 969 days.

(21) Appl. No.: 13/508,818

(22) PCT Filed: Mar. 3, 2010

(86) PCT No.: PCT/JP2010/053447
§ 371 (c)(1),
(2), (4) Date: May 9, 2012

(87) PCT Pub. No.: WO2011/108090
PCT Pub. Date: Sep. 9, 2011

(65) Prior Publication Data
US 2012/0235469 A1 Sep. 20, 2012

(51) Int. Cl.
*B60T 8/40* (2006.01)
*B60T 8/88* (2006.01)
*B60T 8/94* (2006.01)

(52) U.S. Cl.
CPC .............. *B60T 8/4081* (2013.01); *B60T 8/885* (2013.01); *B60T 8/94* (2013.01); *B60T 2270/402* (2013.01)

(58) Field of Classification Search
CPC .... B60T 8/4013; B60T 8/4036; B60T 8/4072; B60T 8/4081; B60T 8/88; B60T 8/885; B60T 8/92; B60T 8/94; B60T 2270/402; B60T 2270/404; B60T 2270/82

(Continued)

(56) References Cited

U.S. PATENT DOCUMENTS 3,199,634 A * 8/1965 Chouings .................... 188/73.42
3,721,321 A * 3/1973 Yarber ......................... 188/72.6
(Continued)

FOREIGN PATENT DOCUMENTS

DE 36 35 054 A1 4/1988
EP 2 532 560 A1 12/2012
(Continued)

OTHER PUBLICATIONS

International Search Report Issued Jun. 8, 2010 in PCT/JP10/53447 Filed Mar. 3, 2010.

*Primary Examiner* — Nicholas J Lane
(74) *Attorney, Agent, or Firm* — Oblon, McClelland, Maier & Neustadt, L.L.P.

(57) ABSTRACT

A hydraulic brake system including: (a) a first hydraulic-pressure generating device including a manual hydraulic pressure source; (b) a second hydraulic-pressure generating device including a power hydraulic pressure source; (c) a manual-operation-associated brake line including a communicating device that is to be brought into communication with the manual hydraulic pressure source and brake cylinder or cylinders of the plurality of hydraulic brakes; (d) an output hydraulic-pressure control device and a flow restraining device disposed in parallel with each other between the manual-operation-associated brake line and the second hydraulic-pressure generating device; and (e) a power hydraulic pressure source control device for activating the power hydraulic pressure source such that the hydraulic pressure is supplied to the manual-operation-associated brake line via the flow restraining device, when the output hydraulic-pressure control device cannot control the hydraulic pressure outputted by the second hydraulic-pressure generating device.

16 Claims, 18 Drawing Sheets

(58) Field of Classification Search
USPC ............... 303/114.1, 119.1, 116.1, 116.2, 10
See application file for complete search history.

(56) References Cited

U.S. PATENT DOCUMENTS

| | | | | |
|---|---|---|---|---|
| 3,935,928 | A * | 2/1976 | Margetts | 188/73.47 |
| 4,301,895 | A * | 11/1981 | Harrison et al. | 188/59 |
| 4,344,510 | A * | 8/1982 | Johannesen et al. | 188/71.9 |
| 4,465,322 | A * | 8/1984 | Hayashi | B60T 8/261 |
| | | | | 303/115.6 |
| 4,793,663 | A * | 12/1988 | Ocvirk et al. | 303/116.1 |
| 4,826,258 | A * | 5/1989 | Ocvirk et al. | 303/113.2 |
| 4,856,852 | A * | 8/1989 | Ocvirk et al. | 303/114.3 |
| 5,013,096 | A * | 5/1991 | Ocvirk et al. | 303/116.1 |
| 5,180,211 | A * | 1/1993 | Weise et al. | 303/9.63 |
| 5,401,084 | A * | 3/1995 | Volz | 303/113.2 |
| 5,431,257 | A * | 7/1995 | Rocca et al. | 188/24.21 |
| 5,460,436 | A * | 10/1995 | Volz et al. | 303/113.2 |
| 7,014,277 | B2 * | 3/2006 | Soga | B60T 8/268 |
| | | | | 303/113.2 |
| 7,673,948 | B2 * | 3/2010 | Otomo | 303/114.1 |
| 8,447,486 | B2 * | 5/2013 | Nakata et al. | 701/70 |
| 8,457,857 | B2 * | 6/2013 | Suda | 701/70 |
| 2002/0011750 | A1 | 1/2002 | Higashimura et al. | |
| 2004/0041467 | A1 * | 3/2004 | Giers et al. | 303/20 |
| 2007/0114842 | A1 * | 5/2007 | Ohkubo et al. | 303/115.1 |
| 2008/0106143 | A1 * | 5/2008 | Yazaki | B60L 7/18 |
| | | | | 303/13 |
| 2009/0216416 | A1 * | 8/2009 | Nanri | B60T 8/1706 |
| | | | | 701/70 |
| 2011/0316326 | A1 * | 12/2011 | Miyazaki et al. | 303/2 |
| 2012/0068529 | A1 * | 3/2012 | Nakaoka et al. | 303/114.1 |
| 2012/0235469 | A1 * | 9/2012 | Miyazaki et al. | 303/9.63 |
| 2012/0256477 | A1 * | 10/2012 | Miyazaki et al. | 303/6.01 |
| 2013/0207451 | A1 * | 8/2013 | Ohkubo et al. | 303/9.62 |
| 2013/0241275 | A1 * | 9/2013 | Miyazaki et al. | 303/6.01 |
| 2013/0249274 | A1 * | 9/2013 | Miyazaki et al. | 303/6.01 |

FOREIGN PATENT DOCUMENTS

| | | |
|---|---|---|
| JP | 63 103756 | 5/1988 |
| JP | 10 287227 | 10/1998 |
| JP | 2001 287637 | 10/2001 |
| JP | 2002 2464 | 1/2002 |
| JP | 2006 123889 | 5/2006 |
| JP | 2007 106143 | 4/2007 |
| JP | 2009 502645 | 1/2009 |

* cited by examiner

HYDRAULIC BRAKE SYSTEM

TECHNICAL FIELD

The present invention relates to a hydraulic brake system including a hydraulic brake provided for restraining rotation of a wheel.

BACKGROUND ART

Patent Document 1 discloses a hydraulic brake system including (a) a master cylinder, (b) a power hydraulic-pressure generating device including a pump device and an accumulator, (c) a plurality of brake cylinders and (d) a common passage to which these elements are connected, wherein an output hydraulic-pressure control valve is disposed between the power hydraulic-pressure generating device and the common passage. When the hydraulic brake system is in a normal state, hydraulic pressure outputted from the power hydraulic-pressure generating device is controlled by control of the output hydraulic-pressure control valve such that the controlled hydraulic pressure is supplied to a plurality of brake cylinders via a common passage. When an electric line of the hydraulic brake system is in a failure state, the power hydraulic-pressure generating device is isolated from the common passage, and the hydraulic pressure in the master cylinder is supplied to the plurality of brake cylinders via the common passage.

Patent Document 2 discloses a hydraulic brake system in which a power hydraulic-pressure generating device is connected, via a valve mechanism 13 and shuttle valves 17, 18, to fluid passages connecting a master cylinder and brake cylinders. The shuttle valves 17, 18 are configured to select a higher one of the hydraulic pressure in the valve mechanism 13 and the hydraulic pressure in the master cylinder, and the selected one is supplied to the brake cylinders.

Patent Document 3 discloses a hydraulic brake system in which each of individual control valves is disposed in midway of a corresponding one of fluid passages connecting a power hydraulic-pressure generating device and brake cylinders. A master cylinder is connected to portions of the respective fluid passages each of which is located on a downstream side of the corresponding individual control valve. When the hydraulic brake system is in a normal state, the hydraulic pressures in the brake cylinders are controlled by utilizing the hydraulic pressure in the power hydraulic-pressure generating device with controls of the respective individual control valves while the brake cylinders are being isolated from the master cylinder. When an electric line of the hydraulic brake system is in a failure state, the hydraulic pressure in the master cylinder is supplied to the brake cylinders.

Patent Document 4 discloses a hydraulic brake system in which, after a vacuum booster has reached its boosting limit, the hydraulic pressure outputted from a pump device is controlled, and the controlled hydraulic pressure is supplied to a pressure chamber that is located on a rear side of a pressurizing piston of a master cylinder. Owing to this arrangement, the hydraulic pressures in the respective brake cylinders can be increased after the vacuum booster has reached its boosting limit, such that a ratio of the hydraulic pressure in the brake cylinder to a brake operating force is not changed between before and after the vacuum booster reaches its boosting limit. In this hydraulic brake system, a relief valve is disposed between the pump device and a main passage connecting the master cylinder and the brake cylinders, such that a pressure discharged from the pump device is supplied to the main passage via the relief valve when the pressure discharged from the pump device becomes excessively high.

PRIOR ART DOCUMENTS

Patent Documents

[Patent Document 1] JP-2006-123889A
[Patent Document 2] JP-2009-502645A
[Patent Document 3] JP-H10-287227A
[Patent Document 4] JP-2001-287637A

DISCLOSURE OF THE INVENTION

Object to be Achieved by the Invention

An object of the present invention is to improve a hydraulic brake system.

Measures for Achieving the Object and Effect

A hydraulic brake system described in claim 1 includes (A) a first hydraulic-pressure generating device including a manual hydraulic pressure source which is configured to generate hydraulic pressure by operation of a brake operating member by an operator, (B) a second hydraulic-pressure generating device including a power hydraulic pressure source which is activatable by supply of electric energy thereto and which is configured to generate hydraulic pressure by activation thereof; (C) a plurality of hydraulic brakes provided for a plurality of wheels of a vehicle, and activatable by hydraulic pressures in respective brake cylinders thereof so as to restrain rotations of the respective wheels; (D) a manual-operation-associated brake line including (i) a communicating device that is to be brought into communication with the manual hydraulic pressure source and at least one of the brake cylinders of the plurality of hydraulic brakes, (ii) the first hydraulic-pressure generating device and (iii) the at least one of the brake cylinders; and (E) (i) an output hydraulic-pressure control device and (ii) a flow restraining device disposed in parallel with each other between the manual-operation-associated brake line and the second hydraulic-pressure generating device, the output hydraulic-pressure control device being configured to control the hydraulic pressure outputted from the second hydraulic-pressure generating device, the flow restraining device being configured to restrain flow of a working fluid away from the second hydraulic-pressure generating device toward the manual-operation-associated brake line.

In the hydraulic brake system according to the present invention, the output hydraulic-pressure control device and the flow restraining device are disposed in parallel with each other between the manual-operation-associated brake line and the second hydraulic-pressure generating device.

For example, when the hydraulic brake system is normal, the hydraulic pressure outputted from the second hydraulic-pressure generating device is controlled by the output hydraulic-pressure control device, and is supplied to the manual-operation-associated brake line whereby the hydraulic brakes are activated. The hydraulic pressures in the brake cylinders are controlled by the output hydraulic-pressure control device that is controlled such that the hydraulic pressures in the respective brake cylinders become close to respective required values.

When the control system of the hydraulic brake system is in failure, the hydraulic pressure in the second hydraulic-pressure generating device is supplied to the manual-operation-associated brake line via the flow restraining device. With supply of the hydraulic pressure to the manual hydraulic pressure source, the hydraulic pressures in the respective brake cylinders can be increased even while an operating force applied to the brake operating member is being kept unchanged. Further, in this instance, since the hydraulic pressure in the second hydraulic-pressure generating device is supplied to the manual-operation-associated brake line via the flow restraining device, it is possible to avoid at least one of (i) supply of the working fluid with an excessively high pressure to the manual-operation-associated brake line and (ii) supply of the working fluid at a high flow rate to the manual-operation-associated brake line, and also to avoid at least one of (i) supply of the working fluid with an excessively high pressure to the manual hydraulic pressure source and (ii) supply of the working fluid at a high flow rate to the manual hydraulic pressure source.

Further, the output hydraulic-pressure control device may be disposed between the second hydraulic-pressure generating device and the manual-operation-associated brake line, and the flow restraining device may be disposed between the second hydraulic-pressure generating device and a portion of the manual-operation-associated brake line, wherein the portion of the manual-operation-associated brake line includes the communicating device, the above-described at least one of the brake cylinders and the manual hydraulic pressure source, namely, wherein the portion of the manual-operation-associated brake line excludes a portion of the manual-operation-associated brake line which is other than the manual hydraulic pressure source of the first hydraulic-pressure generating device.

Any one of the Patent Documents 1-4 does not disclose a hydraulic brake system in which an output hydraulic-pressure control device and a flow restraining device are disposed in parallel with each other between a manual-operation-associated brake line and a second hydraulic-pressure generating device.

Claimable Invention

There will be described various modes of the invention deemed to contain claimable features for which protection is sought. Hereinafter, the invention deemed to contain the claimable features will be referred to as "claimable invention" where appropriate. The claimable invention includes at least "the present invention" or "the invention of the present application" which is an invention described in claims, and could include also specific concept of the invention of the present application, generic concept of the invention of the present application and other concept of the invention of the present application. Each of these modes of the invention is numbered like the appended claims, for easier understanding of the technical features disclosed in the present specification. It is to be understood that the claimable invention is not limited to the technical features or any combinations thereof which will be described in each of these modes. That is, the scope of the claimable invention should be interpreted in the light of the following descriptions accompanying the various modes and preferred embodiments of the invention. In a limit in accordance with such an interpretation, a mode of the claimable invention can be constituted by not only each one of these modes but also either a mode provided by any one of these modes and additional components incorporated therein or a mode provided by any one of these modes without some of components recited therein.

(1) A hydraulic brake system, characterized by comprising:
a first hydraulic-pressure generating device including a manual hydraulic pressure source which is configured to generate hydraulic pressure by operation of a brake operating member by an operator;
a second hydraulic-pressure generating device including a power hydraulic pressure source which is activatable by supply of electric energy thereto and which is configured to generate hydraulic pressure by activation thereof;
a plurality of hydraulic brakes provided for a plurality of wheels of a vehicle, and activatable by hydraulic pressures in respective brake cylinders thereof so as to restrain rotations of the respective wheels;
a manual-operation-associated brake line including (i) a communicating device that is to be brought into communication with said manual hydraulic pressure source and at least one of said brake cylinders of said plurality of hydraulic brakes, (ii) said first hydraulic-pressure generating device, and (iii) said at least one of said brake cylinders; and
an output hydraulic-pressure control device and a flow restraining device disposed in parallel with each other between said manual-operation-associated brake line and said second hydraulic-pressure generating device, said output hydraulic-pressure control device being configured to control the hydraulic pressure outputted from said second hydraulic-pressure generating device, said flow restraining device being configured to restrain flow of a working fluid away from said second hydraulic-pressure generating device toward said manual-operation-associated brake line.

The first hydraulic-pressure generating device includes (x) the manual hydraulic pressure source, and may be constituted by, for example, a master cylinder. Further, the first hydraulic-pressure generating device may include (y) the manual hydraulic pressure source and a controlling mechanism that is configured to control the hydraulic pressure in the manual hydraulic pressure source, wherein the controlling mechanism may be activated by the hydraulic pressure in the second hydraulic-pressure generating device. For example, the first hydraulic-pressure generating device may be (y-1) a master cylinder with a hydraulic force booster or (y-2) a device that is placeable in a state for generating hydraulic pressure based on an operating force applied to the brake operating member and a state for generating hydraulic pressure whose magnitude is independent from the operating force applied to the brake operating member. As an example of (y-2) the latter device, the first hydraulic-pressure generating device may include a pressurizing piston, and may be placeable in (a) a state in which the pressurizing piston is moved forwardly by operation of the brake operating member and (b) a state in which the pressurizing piston is moved forwardly by the hydraulic pressure in the second hydraulic-pressure generating device rather than by operation of the brake operating member. A front pressurizing chamber located on a front side of the pressurizing piston may be considered to correspond to the manual hydraulic pressure source, because the hydraulic pressure is generated in the front pressurizing chamber by the operating force when the pressurizing piston is being moved forwardly by operation of the brake operating member. The second hydraulic-pressure generating device may be connected to the manual hydraulic pressure source such that the hydraulic pressure generated by the second hydraulic-pressure generating device acts on a rear side of the pressurizing piston.

It is noted that the first hydraulic-pressure generating device does not include a reservoir because the first hydraulic-pressure generating device is capable of generating the hydraulic pressure.

The second hydraulic-pressure generating device includes a drive source that is to be activated by supply of an electric energy thereto and a working-fluid supplying portion that is activatable by the drive source. The second hydraulic-pressure generating device may include a power hydraulic pressure source and an accumulator that is configured to retain the working fluid supplied from the working-fluid supplying portion such that the retained working fluid is being pressurized.

The output hydraulic-pressure control device may include, for example, at least one electromagnetic valve capable of controlling the hydraulic pressure outputted from the second hydraulic-pressure generating device. Each of the at least one electromagnetic valve may be either a linear control valve or a simple ON/OFF valve, wherein the linear control valve is an electromagnetic valve which is switchable between at least an open state and a closed state by control of an electric current supplied to a coil of a solenoid (hereinafter simply referred to as "electric current supplied to the solenoid") and which is capable of continuously controlling an opening degree and/or a difference between hydraulic pressure on a high-pressure side of the linear control valve and hydraulic pressure on a low-pressure side of the linear control valve, by continuous control of an electric current supplied to the solenoid, and wherein the simple ON/OFF valve is an electromagnetic valve which is switchable between an open state and a closed state by ON/OFF control of an electric current supplied to the solenoid. In the following description in the present specification, the term "electromagnetic valve" may be interpreted to as either "linear control valve" or "simple ON/OFF valve", unless otherwise specified.

The flow restraining device is configured to impose a limitation on free flow of the working fluid in bilateral directions between the second hydraulic-pressure generating device and the manual-operation-associated brake line, and is not configured to always inhibit the flow of the working fluid therebetween. For example, the flow restraining device may be configured to make the flow rate of the working fluid lower and/or make the pressure of the working fluid lower, as compared with an arrangement in which the flow restraining device is not provided. Specifically, the flow restraining device may include at least one of (a) a pressure reducing device configured to reduce the hydraulic pressure supplied from the second hydraulic-pressure generating device and to supply the reduced hydraulic pressure to the manual-operation-associated brake line, (b) a flow allowing/inhibiting device configured to allow of flow of the working fluid toward the manual-operation-associated brake line when the manual-operation-associated brake line requires the hydraulic pressure to be supplied thereto from the second hydraulic-pressure generating device and to inhibit flow of the working fluid toward the manual-operation-associated brake line or bilateral flow of the working fluid when the manual-operation-associated brake line does not require the hydraulic pressure to be supplied thereto from the second hydraulic-pressure generating device, and (c) a flow resistance applying device such as a flow restrictor configured to increase resistance against the working fluid flowing through a passage.

The manual-operation-associated brake line includes the first hydraulic-pressure generating device, the communicating device and at least one of the brake cylinders. The communicating device can be brought into commutation with the manual hydraulic pressure source and at least one of the brake cylinders, and includes a fluid passage, for example. The communicating device may include a main passage (master passage) connecting the manual hydraulic pressure source and at least one of the brake cylinders, or may include such a main passage, a fluid passage connected to the main passage and a device. It is noted that the quantity of the brake cylinder or cylinders, which are to be brought into communication with the manual hydraulic pressure source through the communicating device, may be either one or at least two.

(2) The hydraulic brake system according to mode (1), comprising a normal-state output hydraulic-pressure control device configured, when a control system of said hydraulic brake system is in a normal state, to control the hydraulic pressures in said brake cylinders of said hydraulic brakes by controlling said output hydraulic-pressure control device.

The hydraulic pressures in the brake cylinders are controlled to become close to required hydraulic pressures, which are determined based on an operational state of the brake operating member by a vehicle operator, or based on a running condition of the vehicle and/or a relative positional relationship between the vehicle and a preceding vehicle.

(3) The hydraulic brake system according to mode (1) or (2), comprising a failure-state working-fluid supplying mechanism configured to allow the working fluid away from said second hydraulic-pressure generating device toward said manual-operation-associated brake line via said flow restraining device when said hydraulic brake system is in a state disabling said output hydraulic-pressure control device from controlling the hydraulic pressure outputted by said second hydraulic-pressure generating device.

In the hydraulic brake system described in this mode, in a failure state in which the hydraulic pressure outputted from the second hydraulic-pressure generating device cannot be controlled by the output hydraulic-pressure control device, the hydraulic pressure can be supplied from the second hydraulic-pressure generating device to the manual-operation-associated brake line. Further, since the working fluid is supplied to the manual-operation-associated brake line via the flow restraining device, it is possible to avoid the working fluid from being supplied to the manual-operation-associated brake line with an excessively high pressure or at a high flow rate.

(4) The hydraulic brake system according to any one of modes (1)-(3), comprising a power hydraulic pressure source control device configured to control said power hydraulic pressure source when said hydraulic brake system is in a state disabling said output hydraulic-pressure control device from controlling the hydraulic pressure outputted by said second hydraulic-pressure generating device.

The state (failure state) disabling the output hydraulic-pressure control device from controlling the hydraulic pressure outputted by the second hydraulic-pressure generating device, is a state in which a control system of the hydraulic brake system is in failure. For example, the state (failure state) disabling the output hydraulic-pressure control device from controlling the hydraulic pressure outputted by the second hydraulic-pressure generating device, corresponds to a state in which the power hydraulic pressure source is activatable in spite of failure of the output hydraulic-pressure control device, a sensor or the like used in control of the output hydraulic-pressure control device, other controlled portion (e.g., other control valve) that is to be controlled in relation with control of the output hydraulic-pressure control device, a main computer controlling the output hydraulic-pressure control device, a main electric power source supplying an electric power to the output hydraulic-pressure control device and the main computer, or an electric line of the main electric power source line.

For example, in event of failure of the output hydraulic-pressure control device as such, failure of the sensor or the like or failure of other controlled portion, the power hydraulic pressure source can be activated.

Further, where the power hydraulic pressure source is controlled by a sub-computer that is other than a main computer controlling the output hydraulic-pressure control device, the power hydraulic pressure source can be controlled by the sub-computer even in event of failure of the main computer.

Moreover, where the sub-computer controlling the power hydraulic pressure source is activatable by an electric power supplied from a sub-electric power source that is other than the main electric power source, the power hydraulic pressure source can be controlled as long as the sub-electric power source and the sub-computer are normal, even in event of failure of the main electric power source and failure of the electric line including the main electric power source.

It is noted that each of an electric power source line and a control line of the power hydraulic pressure source may be constituted by a double line. For example, where the electric power source line is constituted by a double line, it is possible to employ an arrangement in which the electric power is suppliable to the power hydraulic pressure source from both of the main electric power source and the sub-electric power source. Where the control line of the power hydraulic pressure source is constituted by a double line, it is possible to employ an arrangement in which the power hydraulic pressure source is controllable by both of the main computer and the sub-computer.

Further, in a state (normal state) in which the outputted hydraulic pressure can be controlled by the output hydraulic-pressure control device, it is preferable that flow of the working fluid away from the second hydraulic-pressure generating device toward the manual-operation-associated brake line via the flow restraining device is inhibited. Moreover, when the power hydraulic pressure source is activated due to failure of the control system of the hydraulic brake system, it is preferable, but not essential, that the working fluid is inhibited from being supplied from the second hydraulic-pressure generating device to the manual-operation-associated brake line via the output hydraulic-pressure control device.

(5) The hydraulic brake system according to any one of modes (1)-(4), comprising a main electric power source configured to supply an electric power to said output hydraulic-pressure control device and a sub-electric power source configured to supply an electric power to said power hydraulic pressure source.

(6) The hydraulic brake system according to any one of modes (1)-(5), comprising a main computer (CPU) configured to control said output hydraulic-pressure control device and a sub-computer (CPU) configured to control said power hydraulic pressure source.

It is possible to employ an arrangement in which an electric power is supplied to the main computer from the main electric power source while an electric power is supplied to the sub-computer from the sub-electric power source.

(7) The hydraulic brake system according to any one of modes (1)-(6), wherein said communicating device includes a manual passage connecting said manual hydraulic pressure source and said at least one of said brake cylinders, and wherein said flow restraining device is disposed between said second hydraulic-pressure generating device and said manual passage.

The supply of the hydraulic pressure from the second hydraulic-pressure generating device to the manual passage is made via the flow restraining device. The hydraulic pressure supplied to the manual passage via the flow restraining device is supplied to the manual hydraulic pressure source and also to the brake cylinder or cylinders that are connected to the manual passage.

(8) The hydraulic brake system according to mode (7), comprising a manual-passage cut-off valve which is provided in said manual passage and which is an electromagnetic valve switchable between at least an open state and a closed state by control of supply of an electric current to a solenoid thereof, wherein said flow restraining device is disposed between said second hydraulic-pressure generating device and a portion of said manual passage, said portion of said manual passage being closer to said at least one of said brake cylinders than said manual-passage cut-off valve.

There could be a case in which the working fluid is supplied to the manual-operation-associated brake line due to, for example, failure of the flow restraining device, even when supply of the hydraulic pressure from the second hydraulic-pressure generating device is not required in the manual-operation-associated brake line (namely, even when the working fluid is not to be supplied to the manual passage).

In such a case, when the hydraulic pressure supplied from the second hydraulic-pressure generating device to the manual passage is then supplied to the manual hydraulic pressure source, a force is applied to the brake operating member whereby an uncomfortable feeling could be given to the vehicle operator. Further, since the hydraulic pressure in the manual hydraulic pressure source is made higher than a value corresponding to a stroke distance of the brake operating member, there is a risk that the manual hydraulic pressure source could be erroneously detected as being in failure although the manual hydraulic pressure source is actually normal.

On the other hand, in an arrangement in which the hydraulic pressure in the second hydraulic-pressure generating device is supplied onto a downstream side of the manual-passage cut-off valve (i.e., onto one of opposite sides of the manual-passage cut-off valve which is remote from the manual hydraulic pressure source), when the manual-passage cut-off valve is being placed in the closed state, it is possible to prevent the hydraulic pressure (supplied from the second hydraulic-pressure generating device to the manual passage) from being supplied to the manual hydraulic pressure source, and accordingly to prevent an influence affecting on the brake operating member. Thus, it is possible to reduce an uncomfortable feeling given to the vehicle operator who operates the brake operating member. Further, since the supply of the working fluid to the manual hydraulic pressure source is prevented, it is possible to prevent the manual hydraulic pressure source from being erroneously detected as being in failure.

It is noted that, in the arrangement in which the second hydraulic-pressure generating device is connected onto a downstream side of the manual-passage cut-off valve, even when the manual-passage cut-off valve is being placed in the open state, it is possible to more effectively reduce an uncomfortable feeling given to the vehicle operator and to more effectively prevent the manual hydraulic pressure source from being erroneously detected as being in failure, owing to a flow restricting effect provided by the manual-passage cut-off valve, as compared with an arrangement in which the second hydraulic-pressure generating device is connected onto an upstream side of the manual-passage cut-off valve.

(9) The hydraulic brake system according to any one of modes (1)-(8), wherein said communicating device includes (i) a common passage to which said at least one of said brake cylinders is connected via at least one individual passage, (ii) one of said at least one individual passage and (iii) an individual connection passage connecting said one of said at least one individual passage and said manual hydraulic pressure source, and wherein said flow restraining device is disposed between said second hydraulic-pressure generating device and said individual connection passage.

The manual passage can be considered to be constituted by the individual connection passage and a portion of the individual passage which is closer to the corresponding brake cylinder than a connection portion of the individual passage at which the individual passage is connected to the individual connection passage. The flow restraining device is disposed between the second hydraulic-pressure generating device and the individual connection passage as a part of the manual passage.

(10) The hydraulic brake system according to any one of modes (1)-(9), wherein said communicating device includes (i) a common passage to which said at least one of said brake cylinders is connected via at least one individual passage, (ii) one of said at least one individual passage and (iii) an individual connection passage connecting said one of said at least one individual passage and said manual hydraulic pressure source, and wherein said flow restraining device is disposed between said second hydraulic-pressure generating device and said common passage.

The hydraulic pressure in the second hydraulic-pressure generating device is supplied to the common passage via the flow restraining device. The hydraulic pressure thus supplied to the common passage is supplied to the manual hydraulic pressure source via the individual passage and the individual connection passage, and is supplied also to the brake cylinders via the individual passages.

(11) The hydraulic brake system according to mode (10), wherein said one of said at least one individual passage is provided with an individual control valve which is configured to control the hydraulic pressure in one of said brake cylinders that is connected to said one of said at least one individual passage, and wherein said individual connection passage is connected to a portion of said one of said at least one individual passage, said portion of said one of said at least one individual passage being closer to one of said at least one of said brake cylinders than said individual control valve.

The individual connection passage is connected to the portion of the above-described one of the at least one individual passage, which portion is closer to the brake cylinder (or brake cylinders) than the individual control valve. Therefore, between the second hydraulic-pressure generating device and the individual connection passage, at least the flow restraining device and the individual control valve are interposed.

Thus, since the individual control valve is interposed between the second hydraulic-pressure generating device and the individual connection passage, a brake line (first brake line) including the individual connection passage and the manual hydraulic pressure source and a brake line (second brake line) including the second hydraulic-pressure generating device can be made independent from each other, by placing the individual control valve into the closed state. Consequently, even in event of fluid leakage occurring in one of the first and second brake lines, the other of the first and second brake lines can be free from influence of the fluid leakage occurring in the one of the first and second brake lines.

It is noted that the individual control valve may be constituted by, for example, a control valve that is to be used for slip control such as anti-lock control.

(12) The hydraulic brake system according to mode (11), wherein said individual control valve is a normally-open electromagnetic valve that is to be placed in an open state when the electric current is not being supplied to a solenoid thereof.

Where the individual control valve is a normally-open electromagnetic valve, the hydraulic pressure in the second hydraulic-pressure generating device is supplied to the individual connection passage via the flow restraining device and the individual control valve, when the electric current is not being supplied to the solenoid of the individual control valve.

(13) The hydraulic brake system according to any one of modes (1)-(12), wherein said communicating device includes (i) a common passage to which said at least one of said brake cylinders is connected via at least one individual passage, (ii) one of said at least one individual passage and (iii) a common connection passage connecting said common passage and said manual hydraulic pressure source, and wherein said flow restraining device is disposed between said second hydraulic-pressure generating device and said common passage.

(14) The hydraulic brake system according to any one of modes (9)-(13), wherein said output hydraulic-pressure control device is disposed between said second hydraulic-pressure generating device and said common passage.

(15) The hydraulic brake system according to any one of modes (7)-(14), wherein said output hydraulic-pressure control device is disposed between said second hydraulic-pressure generating device and said manual passage.

The hydraulic pressure of the second hydraulic-pressure generating device, which has been controlled by the output hydraulic-pressure control device, may be supplied to either the common passage or the manual passage.

When the hydraulic pressure of the second hydraulic-pressure generating device is controlled by the output hydraulic-pressure control device, it is common that the brake cylinders are isolated from the manual hydraulic pressure source. Further, it is common that the output hydraulic-pressure control device is disposed between the second hydraulic-pressure generating device and a portion of the manual passage which portion is closer to the brake cylinder (or brake cylinders) than the manual-passage cut-off valve.

(16) The hydraulic brake system according to any one of modes (1)-(15), wherein said output hydraulic-pressure control device is disposed between said second hydraulic-pressure generating device and said first hydraulic-pressure generating device.

(17) The hydraulic brake system according to any one of modes (1)-(16), wherein said output hydraulic-pressure control device includes an electromagnetic valve switchable between at least an open state and a closed state by control of supply of an electric current to a solenoid thereof.

(18) The hydraulic brake system according to any one of modes (1)-(17), wherein said output hydraulic-pressure control device includes a linear control valve that is configured to control a difference between hydraulic pressure on a high-pressure side of said linear control valve and hydraulic pressure on a low-pressure side of said linear control valve by control of supply of an electric current to a solenoid thereof.

The output hydraulic-pressure control device may be constructed to include a simple electromagnetic valve that is switchable between an open state and a closed state by ON/OFF control of an electric current supplied to a solenoid thereof, or may be constructed to include a linear control valve that is capable of controlling a difference between the hydraulic pressure on a high-pressure side of the linear control valve and the hydraulic pressure on a low-pressure side of the linear control valve, by control of an amount of electric current supplied to a solenoid thereof.

The output hydraulic-pressure control device is capable of more finely controlling the hydraulic pressure (that is to be subjected to control by the output hydraulic-pressure control device) where the output hydraulic-pressure control device includes the linear control valve than where the output hydraulic-pressure control device includes the simple ON/OFF valve. Further, an operating noise generated by the output hydraulic-pressure control device can be made lower where the control device includes the linear control valve than where the control device includes the simple ON/OFF valve.

The output hydraulic-pressure control device may be constructed to include both of a pressure-increasing control valve and a pressure-reducing control valve, or may be constructed include the pressure-increasing control valve without the pressure-reducing control valve, wherein the pressure-increasing control valve (which is disposed between the second hydraulic-pressure generating device and the manual-operation-associated brake line) is configured to reduce the hydraulic pressure outputted by the second hydraulic-pressure generating device and to output the reduced hydraulic pressure, while the pressure-reducing control valve (which is disposed between a low-pressure side of the pressure-increasing control valve and a low pressure source) is configured to further reduce the hydraulic pressure controlled by the pressure-increasing control valve, namely, further reduce the hydraulic pressure in the manual-operation-associated brake line.

Where the pressure-increasing control valve is constituted by a linear control valve, a difference between the hydraulic pressure in the second hydraulic-pressure generating device and the hydraulic pressure in the manual-operation-associated brake line is controlled. When the hydraulic pressure in the second hydraulic-pressure generating device is regarded as being substantially constant, the hydraulic pressure in the manual-operation-associated brake line is controlled to a magnitude corresponding to an amount of electric current supplied to the solenoid of the pressure-increasing control valve.

(19) The hydraulic brake system according to any one of modes (1)-(18), wherein said flow restraining device includes a relief valve that is configured to allow flow of the working fluid away from said second hydraulic-pressure generating device toward said manual-operation-associated brake line when the hydraulic pressure in said second hydraulic-pressure generating device is higher than the hydraulic pressure in said manual-operation-associated brake line by at least a given value.

(20) The hydraulic brake system according to any one of modes (1)-(19), wherein said flow restraining device includes a normally-closed electromagnetic valve which is switchable between at least an open state and a closed state by control of supply of an electric current to a solenoid thereof and which is to be placed in the closed state when the electric current is not being supplied to the solenoid thereof.

Where the electromagnetic valve is a seating valve, it is common that the valve includes a valve body, a valve seat and a spring biasing the valve body toward the valve seat. Where the electromagnetic valve is disposed such that the hydraulic pressure of the second hydraulic-pressure generating device acts on the valve body, the valve body is separated from the valve seat whereby the valve is switched from the closed state to the open state when the difference between the pressure on the high-pressure side of the valve and the pressure on the low-pressure side of the valve is made larger than a biasing force of the spring. Thus, in the hydraulic brake system described in the present mode, the electromagnetic valve is used as a relief valve.

It is preferable that a setting pressure (that may be referred also to as "valve opening pressure" and "relief pressure") of the relief valve is set to a value which causes the relief valve to be held in the closed state even with the hydraulic pressure of the second hydraulic-pressure generating device acting on the relief valve as long as the hydraulic brake system is normal, and which permits the relief valve to be placed in the open state by control of the power hydraulic pressure source when the control system is in failure.

It is noted that the electromagnetic valve can be used as the output hydraulic-pressure control device when the hydraulic brake system is normal.

Further, even when the hydraulic pressure of the second hydraulic-pressure generating device cannot be controlled by the output hydraulic-pressure control device, the flow of the working fluid away from the second hydraulic-pressure generating device toward the manual-operation-associated brake line can be controlled by control of the electromagnetic valve as long as the electromagnetic valve is being controllable.

(21) The hydraulic brake system according to any one of modes (1)-(20), wherein said flow restraining device includes a reverse-flow checking portion configured to inhibit flow of the working fluid away from said manual-operation-associated brake line toward said second hydraulic-pressure generating device.

It is preferable to inhibit the working fluid from flowing away from the manual-operation-associated brake line toward the second hydraulic-pressure generating device. The above-described electromagnetic valve or the relief valve can be considered to include a reverse-flow checking portion.

(22) The hydraulic brake system according to any one of modes (1)-(21), wherein said power hydraulic pressure source includes (i) a drive source and (ii) a working-fluid supplying portion which is to be activated by said drive source for thereby supplying the working fluid, and wherein said second hydraulic-pressure generating device includes an accumulator configured to retain the working fluid supplied from said working-fluid supplying portion such that the retained working fluid is being pressurized.

When the working fluid supplied from the working-fluid supplying portion is supplied to the manual-operation-associated brake line, pulsation of the working fluid is reduced.

It is noted that, in the hydraulic brake system described in the present mode, between the flow restraining device and the accumulator, there is not provided a check valve for inhibiting flow of the working fluid away from the accumulator toward the flow restraining device.

(23) The hydraulic brake system according to mode (22), comprising:

(x) a normal-state controlling portion that is configured, when a control system of said hydraulic brake system is in a normal state, to control an electric energy supplied to said drive source such that the hydraulic pressure of the working fluid retained in said accumulator is held within a predetermined range; and (y) a failure-state controlling portion that is configured, when said control system of said hydraulic brake system is in a failure state, to control the electric energy supplied to said drive source such that a flow rate of the working fluid supplied from said working-fluid supplying portion is substantially equal to a given value.

The normal-state controlling portion may include a starting/stopping portion which is configured to start activation of the drive source when a pressure in the accumulator becomes lower than a lower limit of the predetermined range and which is configured to stop activation of the drive source when the pressure in the accumulator becomes higher than an upper limit of the predetermined range, so that the accumulator pressure can be held in the predetermined range.

The failure-state controlling portion may be configured to control the electric energy supplied to the drive source such that the working fluid is supplied from the working-fluid supplying portion at a flow rate that is substantially equal to a given value and such that the working fluid is supplied to the manual hydraulic pressure source at a flow rate that is substantially equal to a given value. Each of the given values does not have to be any particular value as long as the hydraulic pressure of the manual hydraulic pressure source can be increased by the supply of the working fluid to the manual hydraulic pressure source even without change of the operating force applied to the brake operating member by the vehicle operator. For example, it is possible to employ an arrangement in which the hydraulic pressure in the manual hydraulic pressure source is adjustable by the vehicle operator, or is controlled to a value that is determined depending on the operating force applied by the vehicle operator (e.g., a value that makes it possible to generate hydraulic pressure larger than the operating force by at least a given value). Further, each of the given values may be either a fixed value or a variable value, and may be updated, as needed, based on a state of the manual hydraulic pressure source (including a state of the brake operating member operated by the vehicle operator).

It is noted that the failure-state controlling portion may include a pattern-based controlling portion that is configured to control the electric current supplied to the drive source such that the flow rate of the working fluid supplied from the working-fluid supplying portion is changed in accordance with a pattern. In this case, each of the given values may be interpreted to mean a final value or a variable value that is variable in accordance with the pattern.

Further, where the drive source is an electric motor, the failure-state controlling portion may include an electric-motor controlling portion that is configured to control the electric current supplied to the electric motor such that the number of revolutions of the electric motor becomes equal to a given value. The electric-motor controlling portion may include a pattern-based controlling portion that is configured to control the supplied electric current such that the number of revolutions of the electric motor is changed in accordance with a predetermined pattern. The failure-state controlling portion may be provided by a portion of the power hydraulic pressure source control device.

(24) The hydraulic brake system according to any one of modes (1)-(23), comprising a front-wheel common passage to which said brake cylinders of said hydraulic brakes provided for respective front right and left wheels as ones of the plurality of wheels are connected via respective two front-wheel individual passages, wherein said manual hydraulic pressure source is constituted by each of two pressurizing chambers of a tandem master cylinder which includes two pressurizing pistons and which is configured to generate the hydraulic pressures in said two pressurizing chambers by operation of said brake operating member, said two pressurizing chambers being connected to said respective two front-wheel individual passages via respective two front-wheel individual connection passages, and wherein said communicating device includes (i) said front-wheel common passage, (ii) one of said two front-wheel individual passages, and (iii) one of said two front-wheel individual connection passages which is connected to said one of said two front-wheel individual passages.

In the hydraulic brake system described in this mode, the brake cylinders provided for the respective front right and left wheels are connected to the respective pressurizing chambers of the master cylinder without via the front-wheel common passage.

The manual-operation-associated brake line includes the communicating device, one of the two pressurizing chambers to which the above-described one of the front-wheel individual connection passages is connected, and one of the brake cylinders which is connected to the one of the two pressurizing chambers.

(25) The hydraulic brake system according to mode (24), comprising:

(i) a front-wheel individual control valve provided in said one of said two front-wheel individual passages, and constituted by a normally-open electromagnetic valve which is switchable between an open state and a closed state by control of supply of an electric current to a solenoid thereof and which is to be placed in the open state when the electric current is not being supplied to the solenoid thereof; and (ii) another front-wheel individual control valve provided in another one of said two front-wheel individual passages, and constituted by a normally-closed electromagnetic valve which is switchable between an open state and a closed state by control of supply of an electric current to a solenoid thereof and which is to be placed in the closed state when the electric current is not being supplied to the solenoid thereof;

wherein said one of said two front-wheel individual connection passages is connected to a portion of said one of said two front-wheel individual passages which is located on a downstream side of said front-wheel individual control valve constituted by said normally-open electromagnetic valve, while another one of said two front-wheel individual connection passages is connected to a portion of said another one of said two front-wheel individual passages which is located on a downstream side of said another front-wheel individual control valve constituted by said normally-closed electromagnetic valve.

The above-described front-wheel individual control valve, which is provided for one of the two front-wheel individual passages, is constituted by a normally-open electromagnetic valve. Meanwhile, the above-described another front-wheel individual control valve, which is provided for another one of the two front-wheel individual passages, is constituted by a normally-close electromagnetic valve.

Where the second hydraulic-pressure generating device is connected to the front-wheel common passage via the output hydraulic-pressure control device, the hydraulic pressure supplied from the second hydraulic-pressure generating device to the front-wheel common passage is supplied to one of the two front-wheel individual connection passages via the normally-open front-wheel individual control valve, whereby the hydraulic pressure is supplied to the manual hydraulic pressure source and also to the brake cylinder or cylinders.

(26) The hydraulic brake system according to mode (24) or (25), comprising manual-passage cut-off valves each of which is provided in a corresponding one of said two front-wheel individual connection passages and each of which is a normally-open electromagnetic valve that is to be placed in an open state when the electric current is not being supplied to a solenoid thereof.

Since each of the manual-passage cut-off valves is a normally-open electromagnetic valve, it is placed in the open state when the electric current is not being supplied to the solenoid thereof. Therefore, the hydraulic pressure supplied from the second hydraulic-pressure generating device to the above-described one of the two front-wheel individual connection passage can be supplied to the manual hydraulic pressure source as well as to the above-described at least one of said brake cylinders.

(27) The hydraulic brake system according to any one of modes (24)-(26), wherein said one of said front-wheel individual connection passages is connected to one of said two pressurizing chambers, and wherein another one of said two pressurizing chambers is provided with a movement limiting portion that is configured to limit movements of said two pressurizing pistons.

Since the movement limiting portion is provided in the other of the two pressurizing chambers, it is preferable that the hydraulic pressure in the second hydraulic-pressure generating device is supplied to the above-described one of the two pressurizing chambers via the flow restraining device.

(28) The hydraulic brake system according to any one of modes (1)-(27), wherein said first hydraulic-pressure generating device includes a hydraulic force booster configured to boost an operating force applied to said brake operating member, and wherein said output hydraulic-pressure control device is disposed between said second hydraulic-pressure generating device and said hydraulic force booster.

The first hydraulic-pressure generating device includes (a) a pressurizing piston that is to be moved forwardly by forward movement of the brake operating member, (b) a front pressurizing chamber that is located on a front side of the pressurizing piston, and (c) a rear pressure chamber (that can be referred to as booster chamber) that is located on a rear side of the pressurizing piston, wherein the above-described at least one of the brake cylinders is connected to the front pressurizing chamber while the second hydraulic-pressure generating device is connected to the rear pressure chamber via the output hydraulic-pressure control device.

Since the hydraulic pressure in the rear pressure chamber is controlled such that the magnitude of the hydraulic pressure in the rear pressure chamber corresponds to the magnitude of the operating force applied to the brake operating member, the magnitude of the hydraulic pressure in the front pressurizing chamber is made to correspond to a boosted magnitude of the operating force applied to the brake operating member. Further, the flow restraining device may be disposed between the second hydraulic-pressure generating device and a pressure-chamber-associated brake line that includes the pressurizing chambers, the brake cylinders and the communicating device that is to be brought into communication with the pressurizing chamber and the brake cylinders. It is noted that the pressure-chamber-associated brake line is a portion of the above-described manual-operation-associated brake line, which portion is located on a front side of the pressurizing piston of the first hydraulic-pressure generating device.

In the first hydraulic-pressure generating device in which the pressurizing piston is moved forwardly by forward movement of the brake operating member, when the hydraulic pressure is supplied to the rear pressure chamber, the hydraulic pressure generated in the front pressurizing chamber is made higher than the hydraulic pressure corresponding to the operating force applied to the brake operating member, namely, is made higher than the hydraulic pressure in the front pressurizing chamber when the hydraulic pressure is not being supplied to the rear pressure chamber. It is noted that there is a case where the hydraulic pressure in the front pressurizing chamber is the same level as an atmospheric pressure when the hydraulic pressure is not being supplied to the rear pressure chamber and the brake operating member is not being operated.

(29) The hydraulic brake system according to any one of modes (1)-(28), wherein said first hydraulic-pressure generating device is placeable in (a) a manual-operation-based hydraulic-pressure generating state, (b) a second-hydraulic-pressure-based hydraulic-pressure generating state and (c) a stroke simulation state, such that said first hydraulic-pressure generating device is configured to generate the hydraulic pressure by operation of said brake operating member when said first hydraulic-pressure generating device is placed in said manual-operation-based hydraulic-pressure generating state, such that said first hydraulic-pressure generating device is configured to generate the hydraulic pressure by supply of the hydraulic pressure controlled by said output hydraulic-pressure control device when said first hydraulic-pressure generating device is placed in said second-hydraulic-pressure-based hydraulic-pressure generating state, and such that said first hydraulic-pressure generating device is configured to generate a reaction force in response to operation of said brake operating member when said first hydraulic-pressure generating device is placed in said stroke simulation state.

While the first hydraulic-pressure generating device is placed in the stroke-simulator state, there are a case where the first hydraulic-pressure generating device is placed in the second-hydraulic-pressure-based hydraulic-pressure generating state and also a case where the first hydraulic-pressure generating device is not placed in the second-hydraulic-pressure-based hydraulic-pressure generating state. That is, there are a case where the first hydraulic-pressure generating device generates the hydraulic pressure in the front pressurizing chamber owing to the hydraulic pressure generated by the second hydraulic-pressure generating device while functioning as the stroke simulator and also a case where the first hydraulic-pressure generating device does not generate the hydraulic pressure in the front pressurizing chamber while functioning as the stroke simulator.

(30) The hydraulic brake system according to mode (29), wherein said first hydraulic-pressure generating device includes (a) a housing, (b) a pressurizing piston which is fluid-tightly and slidably fitted in said housing, (c) a front pressurizing chamber which is located on a front side of said pressurizing piston such that the hydraulic pressure is generated in said front pressurizing chamber by a forward movement of said pressurizing piston, (d) a rear pressure chamber which is located on a rear side of said pressurizing piston, (e) a reaction-force applying mechanism configured to unlink said brake operating member from said pressurizing piston and to apply a reaction force to said brake operating member, and (f) a manual hydraulic-pressure generating mechanism configured to link said brake operating member to said pressurizing piston and to generate the hydraulic force in said front pressurizing chamber such that the generated hydraulic force is based on operation of said brake operating member, and wherein said second hydraulic-pressure generating device is connected to said rear pressure chamber via said output hydraulic-pressure control device.

(31) The hydraulic brake system according to mode (30), comprising a rear hydraulic-pressure controlling portion that is configured to control said output hydraulic-pressure control device on the basis of hydraulic pressures required by said hydraulic brakes, when the reaction force is being applied to said brake operating member by said reaction-force applying mechanism, wherein said flow restraining device is disposed between said second hydraulic-pressure generating device and a pressurizing-chamber-associated brake line as a part of said manual-operation-associated brake line, said pressurizing-chamber-associated brake line including said front pressurizing chamber, said at least one of said brake cylinders and said communicating device that is to be brought into communication with said front pressurizing chamber and said at least one of said brake cylinders.

In the first hydraulic-pressure generating device described in this mode, when the hydraulic brake system is normal, the hydraulic pressure in the front pressurizing chamber is controlled by control of the hydraulic pressure in the rear pressure chamber with the brake operating member being unlinked to the pressurizing piston, so that the hydraulic pressure in the front pressurizing chamber can be controlled to be lower than the hydraulic pressure, which corresponds to the brake operating force applied to the brake operating member when the brake operating member is linked to the pressurizing piston.

Further, when activation of the hydraulic brake is not required even while the brake operating member is being operated, it is possible to avoid generation of the hydraulic pressure in the front pressurizing chamber by inhibiting supply of the hydraulic pressure to the rear pressure chamber.

Moreover, even in such a case when the hydraulic pressure is not generated in the front pressurizing chamber, the provision of the reaction-force applying mechanism permits the brake operating member to be operated, thereby making it possible to avoid reduction of an operation feeling given to the vehicle operator who operates the brake operating member.

Thus, the hydraulic brake system described in this mode is suitable for a regenerative cooperative control.

In event of failure disabling the output hydraulic-pressure control device from controlling the hydraulic pressure in the second hydraulic-pressure generating device, the brake operating member and the pressuring chamber are linked to each other, whereby the pressurizing piston is movable forwardly by forward movement of the brake operating member so that the hydraulic pressure can be generated in the front pressurizing chamber such that a magnitude of the generated hydraulic pressure corresponds to a magnitude of the operating force applied to the brake operating member. In this case, since the hydraulic pressure in the second hydraulic-pressure generating device is supplied to the pressurizing-chamber-associated brake line via the flow restraining device, it is possible to restrain reduction of the hydraulic pressures in the brake cylinders.

(32) A hydraulic brake system, characterized by comprising:

a manual hydraulic pressure source configured to generate hydraulic pressure by operation of a brake operating member by an operator;

a power hydraulic-pressure generating device with accumulating function including (a) a power hydraulic pressure source which is activatable by supply of electric energy thereto and which is configured to generate hydraulic pressure by activation thereof and (b) an accumulator configured to retain a working fluid supplied from said power hydraulic pressure source such that the retained working fluid is being pressurized;

a plurality of hydraulic brakes provided for a plurality of wheels of a vehicle, and activatable by supply of the hydraulic pressure of said manual hydraulic pressure source to respective brake cylinders thereof so as to restrain rotations of the respective wheels; and a relief valve disposed between said manual hydraulic pressure source and said power hydraulic-pressure generating device, said relief valve being configured to allow flow of the working fluid away from said power hydraulic-pressure generating device toward said manual hydraulic pressure source when the hydraulic pressure in said power hydraulic-pressure generating device is higher than the hydraulic pressure in said manual hydraulic pressure source by at least a given value.

The hydraulic brake system disclosed in Patent Document 4 is not provided with an accumulator that is configured to retain the working fluid such that the retained working fluid is being pressurized. Thus, Patent Document 4 does not contain description suggesting technical feature described in this mode.

The technical features described in any one of the above modes (1)-(31) can be employed in the hydraulic brake system described in this mode.

(33) A hydraulic brake system, characterized by comprising:

a manual hydraulic pressure source configured to generate hydraulic pressure by operation of a brake operating member by an operator;

a power hydraulic-pressure generating device including a power hydraulic pressure source which is activatable by supply of electric energy thereto;

a plurality of hydraulic brakes provided for a plurality of wheels of a vehicle, and activatable by hydraulic pressures in respective brake cylinders thereof so as to restrain rotations of the respective wheels;

a brake hydraulic-pressure control device configured to control the hydraulic pressures in said brake cylinders, by isolating said brake cylinders from said manual hydraulic pressure source and utilizing the hydraulic pressure in said power hydraulic-pressure generating device;

a relief valve disposed between a manual-operation-associated brake line and said power hydraulic-pressure generating device, said manual-operation-associated brake line including said manual hydraulic pressure source, at least one of said brake cylinders and a communicating device that is to be brought into communication with said manual hydraulic pressure source and said at least one of said brake cylinders, said relief valve being configured to allow flow of the working fluid away from said power hydraulic-pressure generating device toward said manual-operation-associated brake line when the hydraulic pressure in said power hydraulic-pressure generating device is higher than the hydraulic pressure in said manual-operation-associated brake line by at least a given value; and a failure-state pressure increasing mechanism configured, in event of failure of said brake hydraulic-pressure control device, to supply the hydraulic pressure from said power hydraulic-pressure generating device to said manual-operation-associated brake line such that the hydraulic pressure in said at least one of said brake cylinders are increased while an operating force applied to said brake operating member is being kept unchanged.

The technical features described in any one of the above modes (1)-(32) can be employed in the hydraulic brake system described in this mode.

(34) A hydraulic brake system comprising:

a manual hydraulic pressure source configured to generate hydraulic pressure by operation of a brake operating member by an operator;

a power hydraulic-pressure generating device including a power hydraulic pressure source which is activatable by supply of electric energy thereto; and a plurality of hydraulic brakes provided for a plurality of wheels of a vehicle, and activatable by hydraulic pressures in respective brake cylinders thereof so as to restrain rotations of the respective wheels, said hydraulic brake system being characterized by comprising:

a relief valve disposed between said power hydraulic-pressure generating device and said manual hydraulic pressure source, said relief valve being configured to allow flow of a working fluid away from said power hydraulic-pressure generating device toward said manual hydraulic pressure source when the hydraulic pressure in said power hydraulic-pressure generating device is higher than the hydraulic pressure in said manual hydraulic pressure source by at least a given value;

a normal-state hydraulic-pressure supplying portion configured, when said hydraulic brake system is in a normal state, to control the hydraulic pressure outputted from said power hydraulic-pressure generating device such that the hydraulic pressure outputted from said power hydraulic-pressure generating device is supplied to said plurality of brake cylinders without via said relief valve; and a failure-state hydraulic-pressure supplying portion configured, when a control system of said hydraulic brake system is in a failure state, to activate said power hydraulic pressure source such that the hydraulic pressure outputted from said power hydraulic-pressure generating device is supplied to said manual hydraulic pressure source via said relief valve.

The normal-state controlling portion may be configured to control the power hydraulic pressure source or control the output hydraulic-pressure control valve that is provided on an output side of the power hydraulic pressure source. Where the normal-state controlling portion is configured to control the power hydraulic pressure source, the power hydraulic pressure source is controlled by the normal-state controlling portion such that an actual value of the hydraulic pressure in each brake cylinder becomes close to a required value.

On the other hand, the failure-state controlling portion may be configured to control the power hydraulic pressure source in accordance with, for example, a failure-state control pattern, such that the flow rate of the working fluid supplied to the manual hydraulic pressure source can be held substantially in a given value, rather than such that an actual value of the hydraulic pressure in each brake cylinder is equal to a required value.

The technical features described in any one of the above modes (1)-(33) can be employed in the hydraulic brake system described in this mode. For example, in the hydraulic brake system described in this mode may be constructed to include an accumulator.

(35) A hydraulic brake system comprising:

a manual hydraulic pressure source configured to generate hydraulic pressure by operation of a brake operating member by an operator;

a power hydraulic pressure source which is activatable by supply of electric energy thereto so as to generate hydraulic pressure;

a plurality of hydraulic brakes provided for a plurality of wheels of a vehicle, and activatable by hydraulic pressures in respective brake cylinders thereof so as to restrain rotations of the respective wheels;

a common passage to which said brake cylinders are connected via individual passages;

an individual connection passage connecting one of said individual passages and said manual hydraulic pressure source;

a linear control valve and an electromagnetic valve disposed in parallel with each other between said power hydraulic pressure source and said common passage, said linear control valve being configured to continuously control a magnitude of the hydraulic pressure in said common passage, by continuous control of an electric current supplied to a solenoid thereof, said electromagnetic valve being switchable between an open state and a closed state by control of supply of an electric current to a solenoid thereof.

(36) The hydraulic brake system according to any one of modes (1)-(35), wherein said manual hydraulic pressure source is constituted by each of two pressurizing chambers of a tandem master cylinder which includes two pressurizing pistons and which is configured to generate the hydraulic pressures in said two pressurizing chambers by operation of said brake operating member, and wherein a hysteresis relationship is established between each of the hydraulic pressures in said two pressurizing chambers and an operating force applied to said brake operating member.

MODES FOR CARRYING OUT THE INVENTION

Figure 1:
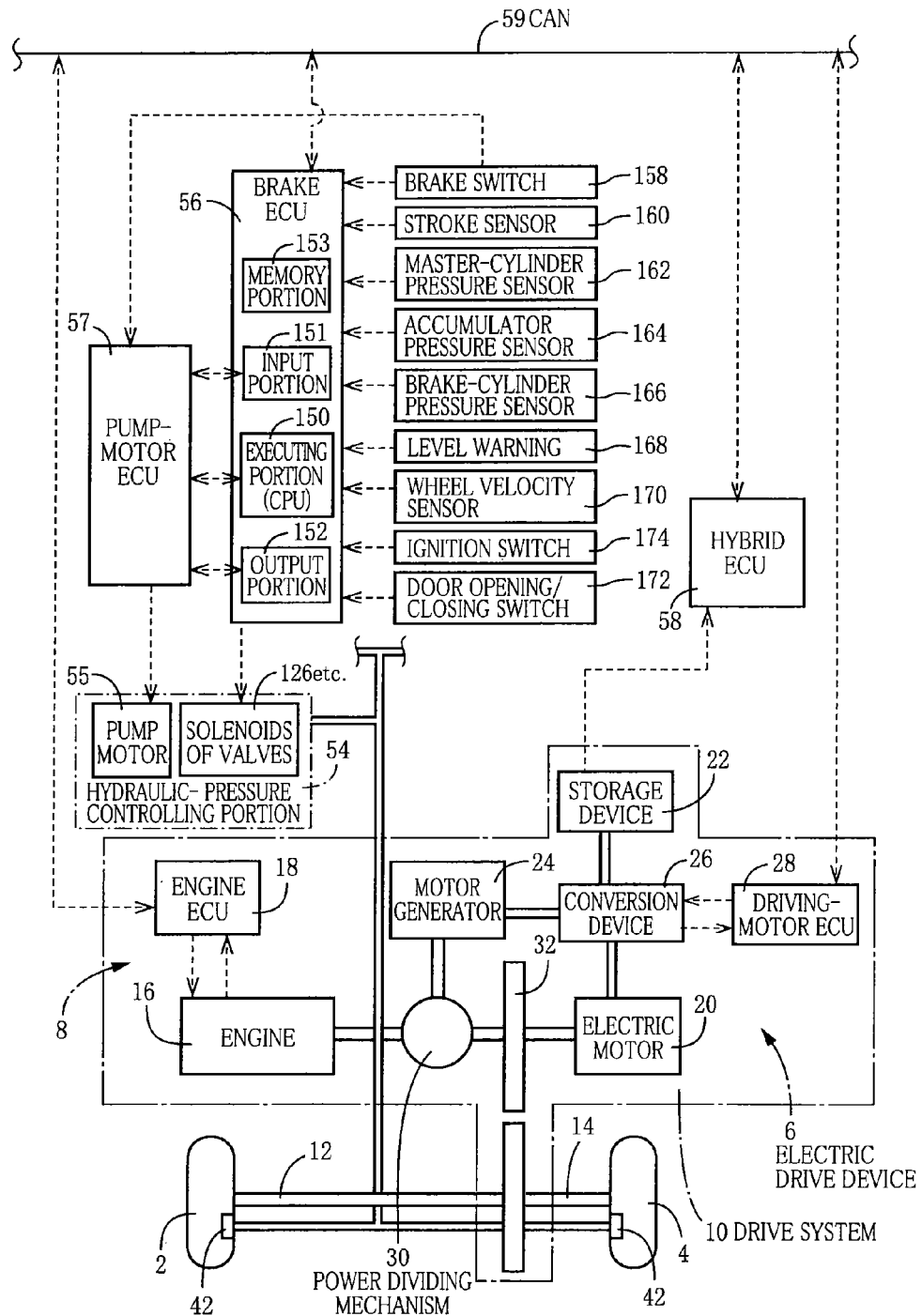
FIG. 1 is a view showing an entirety of a vehicle in which a hydraulic brake system according to an embodiment 1 of the present invention is installed.

Hereinafter, a brake system as an embodiment of the present invention will be described with reference to drawings.

Embodiment 1

Vehicle

There will be first described a vehicle on which a hydraulic brake system as the brake system according to the embodiment 1 is installed.

This vehicle is a hybrid vehicle including driving units in the form of an electric motor and an engine, so that front right and left wheels 2, 4 as drive wheels are to be driven by a drive system 10 including an electric drive device 6 and an internal-combustion drive device 8. A drive power of the drive system 10 can be transmitted to the front right and left wheels 2, 4 via drive shafts 12, 14. The internal-combustion drive device 8 includes an engine 16 and an engine ECU 18 that is configured to control activation of the engine 16. The electric drive device 6 includes a driving electric motor (hereinafter referred to as a driving motor) 20, a storage device 22, a motor generator 24, a conversion device 26, a driving-motor ECU 28 and a power dividing mechanism 30. The driving motor 20, motor generator 24, engine 16 and power dividing mechanism 30 (to which the driving motor 20, motor generator 24 and engine 16 are connected) are controlled so as to selectively establish a state in which only a driving torque of the driving motor 20 is transmitted to an output member 32, a state in which a driving torque of the engine 16 and the driving torque of the driving motor 20 are both transmitted to the output member 32, and a state in which an output of the engine 16 is outputted to the motor generator 24 and the output member 32. The driving force transmitted to the output member 32 is transmitted to the drive shafts 12, 14 via a speed reducer and differential gears.

The conversion device 26 includes an inverter, and is controlled by the driving-motor ECU 28. With electric current control of the inverter, the conversion device 26 selectively establishes at least a driving state in which the driving motor 20 is rotated by electric energy supplied from the storage device 22 to the driving motor 20 and a charging state in which the conversion device 26 serves as a generator upon regenerative braking so as to charge the storage device 22 with electric energy. During the charging state, a regenerative braking torque is applied to each of the front right and left wheels 4, 2. In this sense, the electric drive device 6 can be considered as a regenerative braking device.

The hydraulic brake system includes brake cylinders 42 of respective hydraulic brakes 40 provided for the respective front right and left wheels 2, 4, brake cylinders 52 of respective hydraulic brakes 50 provided for the respective rear right and left wheels 46, 48 (see FIG. 2), and a hydraulic-pressure controlling portion 54 configured to control hydraulic pressures of the respective brake cylinders 42, 52. As described below, the hydraulic-pressure controlling portion 54 includes a plurality of electromagnetic valves and a pump motor 55 as a drive source of power hydraulic pressure source which is to be driven by supply of electric energy to the pump motor 55, so that a solenoid of each of the plurality of electromagnetic valves is controlled based on commands of a brake ECU 56 that is constituted principally by a computer while the pump motor 55 is controlled based on commands of a pump-motor ECU 57.

Further, the vehicle is provided with a hybrid ECU 58. The hybrid ECU 58, brake ECU 56, engine ECU 18 and driving-motor ECU 28 are connected to one another via CAN (car area network) 59, so that these ECUs 58, 56, 18, 28 are communicable to one another, and required information are transmitted among the ECUs 58, 56, 18, 28 as needed.

The present hydraulic brake system is installable on not only a hybrid vehicle but also a plug-in hybrid vehicle, an electric vehicle and a fuel battery vehicle. In an electric vehicle, the internal-combustion drive device 8 is not required. In a fuel battery vehicle, the driving motor is driven by, for example, a fuel battery stack.

Further, the present hydraulic brake system is installable also on an internal-combustion drive vehicle. In such a vehicle not equipped with the electric drive device 6, a regenerative braking torque is not applied to the driving wheels 2, 4 so that a regenerative cooperative control is not executed.

Further, to elements included in the present hydraulic brake system, electric energy is supplied from a common electric power source (e.g., storage device 22).

<Hydraulic Brake System>

The hydraulic brake system will be next described. In the following description, each of the brake cylinders, hydraulic brakes and electromagnetic valves will be referred together with, as a suffix, one of reference signs (FR, FL, RR, RL) indicative of the respective front right, front left, rear right and rear left wheels, where it should be clarified which one of the four wheels the referred brake cylinder, hydraulic brake or electromagnetic valve corresponds to. However, each of the brake cylinders, hydraulic brakes and electromagnetic valves will be referred without such reference signs, where it is referred to as a representative of those provided for the four wheels, or where the above-described clarification is not required.

Figure 2:
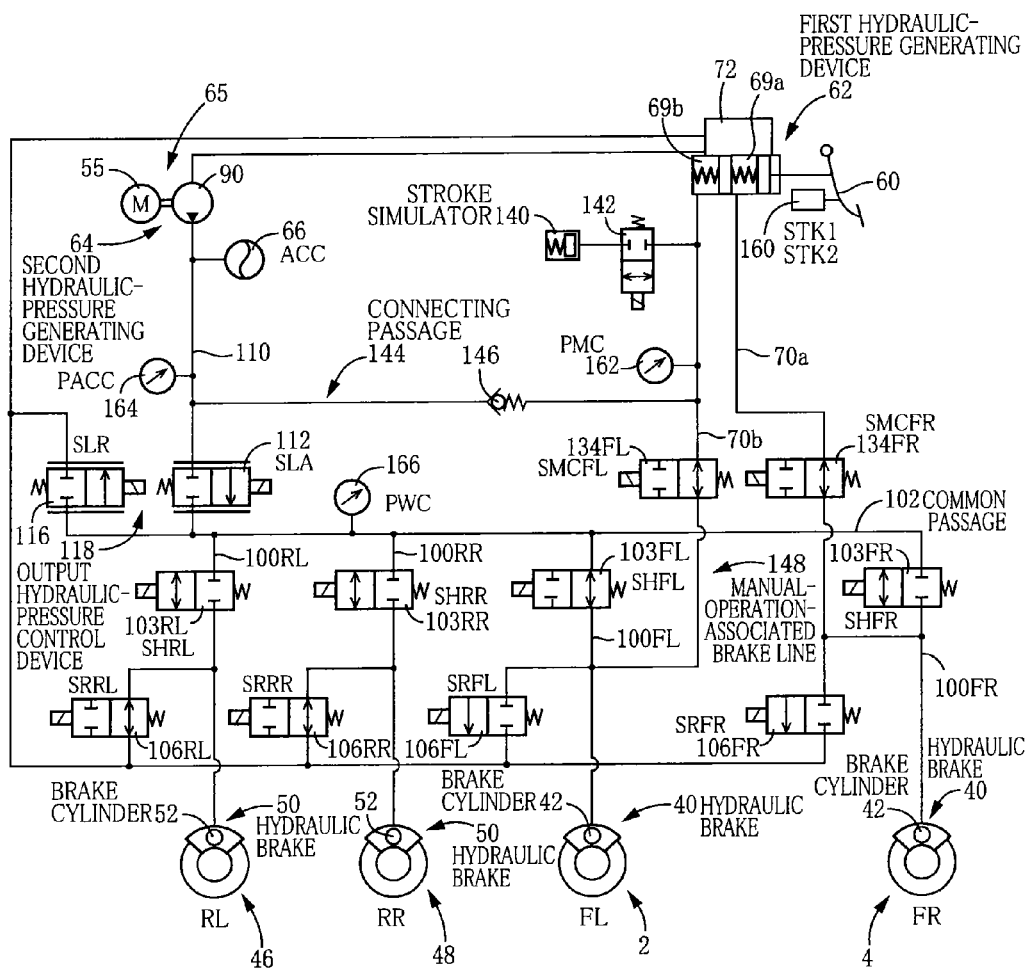
FIG. 2 is a diagram of a hydraulic circuit of the hydraulic brake system.

The present brake system includes a brake circuit shown FIG. 2 in which reference sign "60" denotes a brake pedal as a brake operating member, reference sign "62" denotes a master cylinder as a first hydraulic-pressure generating device which is configured to generate hydraulic pressure by operation of the brake pedal 60, and reference sign "64" denotes a second hydraulic-pressure generating device including a pump device 65 and an accumulator 66. The hydraulic brakes 40, 50 are to be activated by hydraulic pressures of the respective brake cylinders 42, 52. In the present embodiment, each of the hydraulic brakes 40, 50 is a disk brake.

It is noted that each of the hydraulic brakes 40, 50 may be a drum brake. It is further noted that each of the hydraulic brakes 40 provided for the front wheels 2, 4 may be a disk brake while each of the hydraulic brakes 50 provided for the rear wheels 46, 48 may be a drum brake.

Figure 3:
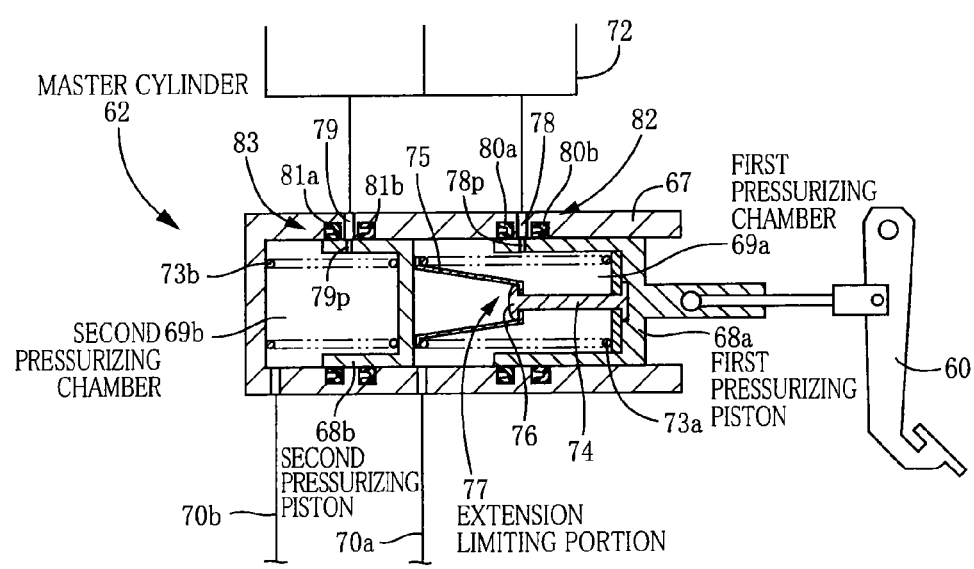
FIG. 3 is a cross sectional view showing a master cylinder that is included in the hydraulic brake system.

As shown in FIG. 3, the master cylinder 62 is a tandem cylinder including (a) a housing 67 and (b) first and second pressurizing pistons 68a, 68b slidably fitted in the housing 67. The master cylinder 62 has first and second pressurizing chambers 69a, 69b such that the first pressurizing chamber 69a is located on a front side of the first pressurizing piston 68a while the second pressurizing chamber 69b is located on a front side of the second pressurizing piston 68b. In the present embodiment, the first and second pressurizing chambers 69a, 69b serve as first and second manual hydraulic pressure sources, respectively. Further, to the first and second pressurizing chamber 69a, 69b, the brake cylinders 42FR, 42FL as first and second brake cylinders are connected via first and second master cylinder passages 70a, 70b, respectively.

Further, the first and second pressurizing chambers 69a, 69b are brought into communication with a reservoir 72 as a low pressure source, when the first and second pressurizing pistons 68a, 68b reach respective rearward end positions. The reservoir 72 defines therein an inside space that is partitioned into a plurality of storage chambers configured to store therein working fluid. The storage chambers of the reservoir 72 are connected to the pressurizing chambers 69a, 69b and the pump device 65.

A return spring 73a is disposed between the first and second pressurizing pistons 68a, 68b, while a return spring 73b is disposed between a bottom portion of the housing 67 and the second pressurizing chamber 68b, so that the first and second pressurizing pistons 68a, 68b are biased by the return springs 73a, 73b, respectively, in a backward direction. The first pressurizing piston 68a is associated with the brake pedal 60, and is moved in a forward direction when a depression force as an operating force is applied to the brake pedal 60.

Further, a pin 74 is fixedly disposed on a forward side portion of the first pressurizing piston 68a while a retainer 75 is disposed on a backward side portion of the second pressurizing piston 68b. The pin 74 is engaged with the retainer 75, such that the pin 74 is movable relative to the retainer 75 whereby the first and second pressurizing pistons 68a, 68b are movable relative to each other.

With a head portion (engaging portion) 76 of the pin 74 being brought into contact with an engagement portion of the retainer 75, backward movement of the first pressurizing piston 68a relative to the second pressurizing piston 68b is limited, in other words, forward movement of the second pressurizing piston 68b relative to the first pressurizing piston 68a is limited. In the present embodiment, an extension limiting portion 77 is constituted by the pin 74 and the retainer 75, for example.

In a tubular portion of the housing 67, reservoir ports 78, 79 are provided so as to be held in communication with the reservoir 72. A communication hole 78p is provided in a portion of the first pressurizing piston 68a, which is aligned with the reservoir port 78 when the first pressurizing piston 68a is being positioned in the rearward end position. A communication hole 79p is provided in a portion of the second pressurizing piston 68b, which is aligned with the reservoir port 79 when the second pressurizing piston 68b is being positioned in the rearward end position. Further, a pair of cup seals 80a, 80b are provided in respective portions of the housing 67 that are located on front and rear sides of the reservoir port 78, respectively, while a pair of cup seals 81a, 81b are provided in respective portions of the housing 67 that are located on front and rear sides of the reservoir port 79, respectively. When the first and second pressurizing pistons 68a, 68b are being positioned in the respective rearward end positions, the communication holes 78p, 79p are opposed to the reservoir ports 78, 79, respectively, so that the first and second pressurizing chamber 69a, 69b are held in communication with the reservoir 72. When the first and second pressurizing pistons 68a, 68b are moved in the forward direction, the first and second pressurizing chambers 69a, 69b become isolated from the reservoir 72, so that hydraulic pressure dependent on the depression force applied to the brake pedal 60 is generated in each of the first and second pressurizing chambers 69a, 69b. In the present embodiment, the reservoir port 78, communication hole 78p and cup seals 80a, 80b cooperate to constitute a reservoir cut-off valve 82, while the reservoir port 79, communication hole 79p and cup seals 81a, 81b cooperate to constitute a reservoir cut-off valve 83.

It is noted that the biasing force (set load, spring constant) of the return spring 73b is smaller than that of the return spring 73a.

In the second hydraulic-pressure generating device 64, the pump device 65 includes a pump 90 as a working-fluid supplying portion and the pump motor 55 as a drive source, so that the working fluid is pumped from the reservoir 72 by activation of the pump 90, and the pumped working fluid is accumulated in the accumulator 66. The pump motor 55 is controlled based on commands supplied from the pump-motor ECU 57 such that the pressure of the working fluid accumulated in the accumulator 66 is held within a predetermined range.

The brake ECU 56 supplies information indicating that the accumulator pressure (i.e., the hydraulic pressure of the working fluid stored in the accumulator 66) becomes lower than a lower limit of the predetermined range and that the accumulator pressure reaches an upper limit of the predetermine range (or information representing a magnitude of the accumulator pressure), to the pump motor ECU 57, so that the pump motor 55 is controlled based on the supplied information.

When the accumulator pressure becomes lower than the lower limit of the predetermined range, the pump motor 55 is started. When the accumulator pressure becomes higher than the upper limit of the predetermined range, the pump motor 55 is stopped. Thus, as long as the hydraulic brake system is normal, the pump motor 55 is controlled such that the accumulator pressure is held within the predetermined range.

On the other hands, the brake cylinders 42FR, 42FL provided for the front right and left wheels 2, 4 and the brake cylinders 52RR, 52RL provided for the rear right and left wheels 46, 48 are connected to a common passage 102 via respective individual passages 100FR, 100FL, 100RR, 100RL, respectively.

The individual passages 100FR, 100FL, 100RR, 100RL are provided with respective pressure holding valves (SHij: i=F, R; j=L, R) 103FR, 103FL, 103RR, 103RL. Between the brake cylinders 42FR, 42FL, 52RR, 52RL and the reservoir 72, there are disposed pressure reducing valves (SRij: i=F, R; j=L, R) 106FR, 106FL, 106RR, 106RL.

The pressure holding valve 103FL provided for the front left wheel 2 is a normally-open electromagnetic valve that is to be placed in an open state when electric current is not being supplied to a coil of a solenoid thereof (hereinafter simply referred to as "supplied to the solenoid"). Each of the other pressure holding valves 103FR, 103RR, 103RL provided for the front right, rear right and rear left wheels 4, 48, 46, respectively, is a normally-close electromagnetic valve that is to be placed in a closed state when electric current is not being supplied to a solenoid thereof.

Each of the pressure reducing valves 106FR, 106FL provided for the front right and left wheels 2, 4 is a normally-close electromagnetic valve, while each of the pressure reducing valves 106RR, 106RL provided for the rear right and left wheels 48, 46 is a normally-open electromagnetic valve.

To the common passage 102 to which the brake cylinders 42, 52 are connected, the second hydraulic-pressure generating device 64 is also connected via a controlled-pressure passage 110.

The controlled-pressure passage 110 is provided with a pressure-increasing linear control valve (SLA) 112. A pressure-reducing linear control valve (SLR) 116 is provided between the controlled-pressure passage 110 and the reservoir 72. With the pressure-increasing linear control valve 112 and pressure-reducing linear control valve 116 being controlled, the hydraulic pressure outputted by the second hydraulic-pressure generating device 64 is controlled, and the controlled hydraulic pressure is supplied to the common passage 102. The pressure-increasing linear control valve 112 and the pressure-reducing linear control valve 116 cooperate to constitute an output hydraulic-pressure control device 118. Further, each of the pressure-increasing linear control valve 112 and pressure-reducing linear control valve 116 may be referred to as an output hydraulic-pressure control valve. Each of the pressure-increasing linear control valve 112 and pressure-reducing linear control valve 116 is a normally-close electromagnetic valve which is to be placed in a closed state when electric current is not being supplied to a solenoid thereof, and which is configured to output hydraulic pressure whose magnitude is continuously controlled by continuously controlling an amount of the electric current supplied to the solenoid.

Figure 4A:
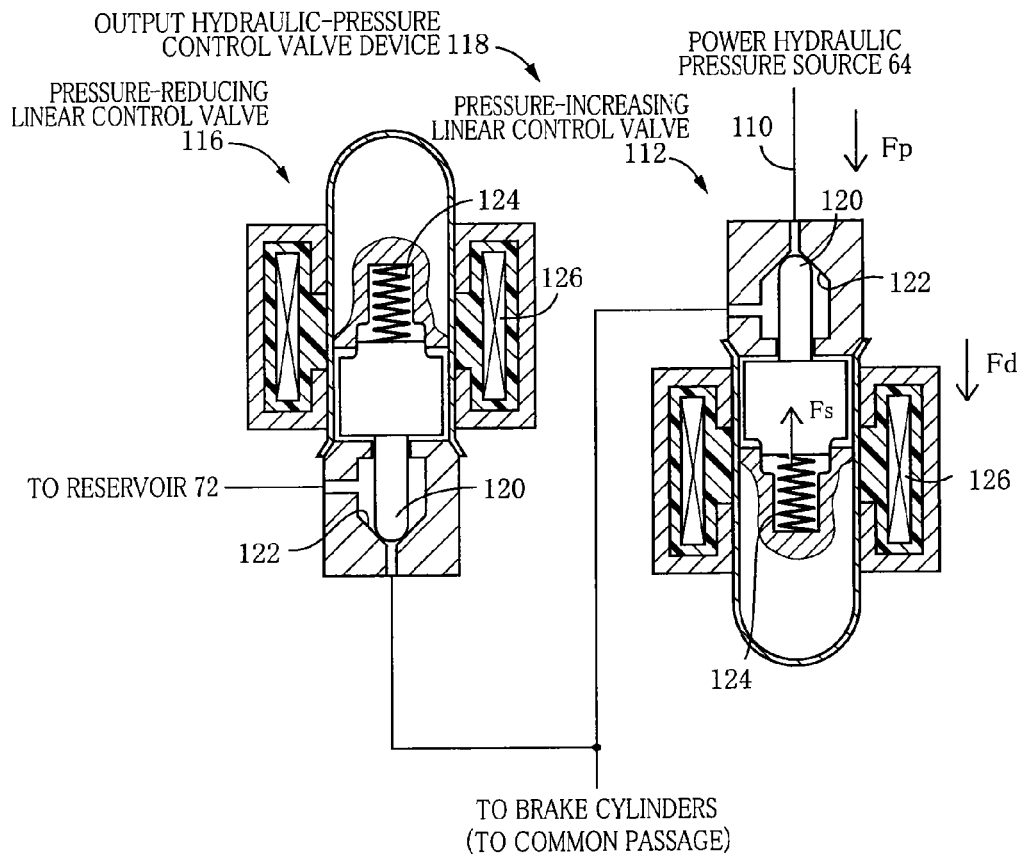
FIG. 4A is a cross sectional view showing a pressure-increasing linear control valve and a pressure-reducing linear control valve that are included in the hydraulic brake system.
Figure 4B:
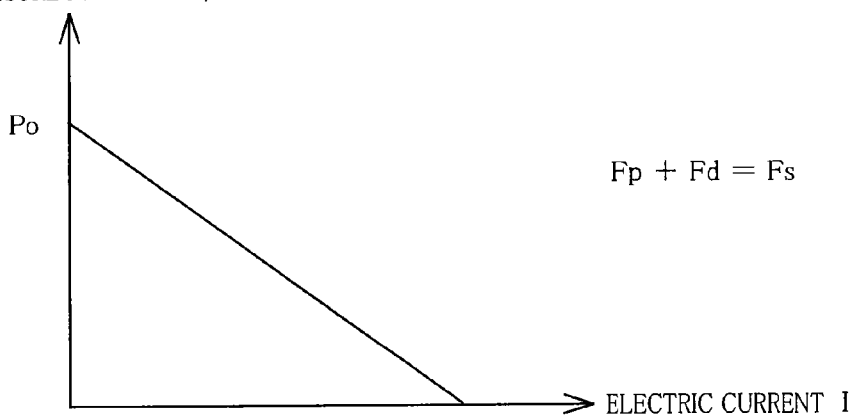
FIG. 4B is a view showing a valve opening characteristic of each of the pressure-increasing linear control valve and the pressure-reducing linear control valve.

As shown in FIG. 4 (a), each of the pressure-increasing linear control valve 112 and pressure-reducing linear control valve 116 includes a valve body 120, a valve seat 122 (that cooperates with the valve body 120 to constitute a seating valve), a spring 124 and a solenoid 126. The spring 124 generates a biasing force Fs forcing the valve body 120 in a direction toward the valve seat 122. The solenoid 126, when electric current is being applied thereto, generates a driving force Fd forcing the valve body 120 in a direction away from the valve seat 122. Further, in the pressure-increasing linear control valve 112, a pressure-difference-based force Fp, which is generated based on a difference between pressure in the second hydraulic-pressure generating device 64 and pressure in the common passage 102, acts on the valve body 120, forcing the valve body 120 to be displaced in a direction away from the valve seat 122. In the pressure-reducing linear control valve 116, a pressure-difference-based force Fp, which is generated based on a difference between pressure in the common passage 102 (controlled-pressure passage 110) and pressure in the reservoir 72, acts on the valve body 120, forcing the valve body 120 to be displaced in a direction away from the valve seat 122 (Fd+Fp:Fs). In each of the valves 112, 116, the pressure-difference-based force Fp is controlled by controlling the electric current that is supplied to the solenoid 126, whereby the hydraulic pressure in the common passage 102 is controlled.

FIG. 4 (b) shows a characteristic of the pressure-increasing linear control valve 112, which is a relationship between the supply current I (supplied to the solenoid 126) and a valve opening pressure. From FIG. 4 (b), it is understood that the pressure difference, which is required for causing the pressure-increasing linear control valve 112 to be switched from the closed state to the open state, is higher when the supply current I is small than when the supply current I is large. For example, when the electric current is not being supplied to the solenoid 126, the pressure-increasing linear control valve 112 is not switched from the closed state to the open state, as long as the pressure difference is smaller than the valve opening pressure Po. It is noted that the pressure-reducing linear control valve 116 has substantially the same characteristics as the pressure-increasing linear control valve 112.

On the other hand, the first master cylinder passage 70a is connected to a portion of the individual passage 100FR provided for the front right wheel 4, which portion is located on a downstream side of the pressure holding valve 103FR, namely, is portion is located between the pressure holding valve 103FR and the brake cylinder 42FR. Meanwhile, the second master cylinder passage 70b is connected to a portion of the individual passage 100FL provided for the front left wheel 2, which portion is located on a downstream side of the pressure holding valve 103FL, namely, is portion is located between the pressure holding valve 103FL and the brake cylinder 42FL. That is, each of the first and second master cylinder passages 70a, 70b is connected directly to a corresponding one of the brake cylinders 42FR, 42FL, without each of the first and second master cylinder passages 70a, 70b being connected to the common passage 102.

A first master cut-off valve (SMCFR) 134FR is provided on a midway of the first master cylinder passage 70a, while a second master cut-off valve (SMCFL) 134FL is provided on a midway of the second master cylinder passage 70b. The first and second master cut-off valves 134FR, 134FL, each of which is a normally-open electromagnetic valve, correspond to first and second manual-passage cut-off valves, respectively.

Further, a stroke simulator 140 is connected to the second master cylinder passages 70b via a simulator controlling valve 142 that is a normally-close electromagnetic valve. Since the set load of the return spring 73b is smaller than the set load of the return spring 73b, as described above, the return spring 73b is first compressed when the operating force is applied to the brake pedal 60. Therefore, the stroke simulator 140 is provided in the second master cylinder passage 70b that is connected to the second pressurizing chamber 69b.

A connection passage 144 is provided to connect a connected portion of the controlled-pressure passage 110 and a connected portion of the second master cylinder passage 70b. The connected portion of the controlled-pressure passage 110 is located between the pressure-increasing linear control valve 112 and a portion of the controlled-pressure passage 110 to which the accumulator 66 is connected. The connected portion of the second master cylinder passage 70b is located between the second master cut-off valve 134FL and a portion of the second master cylinder passage 70b to which the stroke simulator 140 is connected.

The connection passage 144 is provided with a relief valve 146 which is configured to allow flow of the working fluid from the second hydraulic-pressure generating device 64 to the second master cylinder passage 70b when the hydraulic pressure in the second hydraulic-pressure generating device 64 becomes higher than the hydraulic pressure in the second master cylinder passage 70b by a given value Pr or more. The given value Pr is dependent on a set load of a spring of the relief valve 146, and may be referred to as a valve opening pressure or a relief pressure of the relief valve 146. The given value Pr is smaller than a valve opening pressure Po of the pressure-increasing linear control valve 112, but is higher than an upper limit value Paccu of the working fluid that can be retained in the accumulator 66.

$Pr < Po$ $Pr > Paccu$

Thus, the working fluid is avoided from flowing away from the accumulator 66 toward the second master cylinder passage 70b via the relief valve 146, when the pump motor 55 is controlled during normality of the hydraulic brake system such that the accumulator pressure is held in the predetermined range, and/or when the hydraulic pressures in the brake cylinders 42, 52 are controlled by use of the hydraulic pressure in the second hydraulic-pressure generating device 64.

As described above, in the present embodiment, the hydraulic-pressure controlling portion 54 is constituted by components such as the pump motor 55, output hydraulic-pressure control device 118, master cut-off valve 134, pressure holding valve 103 and pressure reducing valve 106.

Further, the manual-operation-associated brake line 148 is constituted by components such as the second pressurizing chamber 69b, second master cylinder passage 70b, individual passage 100FL and common passage 102. A communicating device is constituted by a portion of the manual-operation-associated brake line 148, i.e., components such as the second master cylinder passage 70b, individual passage 100FL and common passage 102.

The second hydraulic-pressure generating device 64 is connected to the common passage 102 of the manual-operation-associated brake line 148 via the pressure-increasing linear control valve 112, and is connected also to the second master cylinder passage 70b via the relief valve 146. The pressure-increasing linear control valve 112 and the relief valve 146 are disposed in parallel with each other between the second hydraulic-pressure generating device 64 and the manual-operation-associated brake line 148.

As shown in FIG. 1, the brake ECU 56 is constituted principally by a computer including an executing portion (CPU) 150, an input portion 151, an output portion 152 and a memory portion 153. To the input portion 152, there are connected, for example, a brake switch 158, a stroke sensor 160, a master-cylinder pressure sensor 162 as a manual hydraulic-pressure sensor, an accumulator pressure sensor 164, a brake-cylinder pressure sensor 166, a level warning switch 168, a wheel velocity sensor 170, a door opening/closing switch 172 and an ignition switch 174.

The brake switch 158 is a switch, which is turned from its OFF state to its ON state when the brake pedal 60 is operated. In the present embodiment, the brake switch 158 is placed in its ON state when the brake pedal 60 is advanced from the rearward end position by a predetermined amount or more than the predetermined amount.

The stroke sensor 160 is configured to detect an operating stroke (STK) of the brake pedal 60. In the present embodiment, the stroke sensor 160 is constituted by two sensor switches both of which are configured to detect the operating stroke of the brake pedal 60 (i.e., deviation of the brake pedal 60 from the rearward end position). Thus, the stroke sensor 160 has two systems, so that the stroke can be detected by one of the two sensor switches even in the event of failure of the other of the two sensor switches.

The master-cylinder pressure sensor 162 is provided in the second master cylinder passages 70b, and is configured to detect the hydraulic pressure in the second pressurizing chamber 69b of the master cylinder 62. Since the set load of the return spring 73b is smaller than the set load of the return spring 73a, as described above, the return spring 73b is compressed earlier than the return spring 73a, so that the hydraulic pressure in the second pressurizing chamber 69b is increased earlier than the hydraulic pressure in the first pressuring chamber 69a. Thus, by the providing the master-cylinder pressure sensor 162 in the second master cylinder passage 70b, it is possible to restrain delay of detection of the hydraulic pressure in the master cylinder 62.

The accumulator pressure sensor 164 is configured to detect pressure (PACC) of working fluid accumulated in the accumulator 66.

The brake-cylinder pressure sensor 166 is provided in the common passage 102, and is configured to detect pressure (PWC) in the brake cylinders 42, 52. When each of the pressure holding valves 103 is placed in the open state, the common passage 102 is held in communication with each of the brake cylinders 42, 52, so that the hydraulic pressure in each of the brake cylinders 42, 52 can be made equal to the hydraulic pressure in the common passage 102. Further, the brake-cylinder pressure sensor 166 may be also referred to as a controlled hydraulic-pressure sensor, since the hydraulic pressure of the power hydraulic pressure source 64, which is controlled by the output hydraulic-pressure control device 118, is supplied to the common passage 102 that is provided with the brake-cylinder pressure sensor 166.

The level warning switch 168 is a switch which is to be turned to the OFF state when the working fluid reserved in the reservoir 72 becomes not larger than a predetermined amount. In the present embodiment, when the amount of the working fluid reserved in one of the plurality of chambers of the reservoir 72 becomes not larger than a predetermined amount, the level warning switch 168 is turned to the OFF state.

The wheel velocity sensor 170 is provided for each of the front right wheel 4, front left wheel 2, rear right wheel 48 and rear left wheel 46, so as to detect rotational velocity of each of the wheels. A running velocity of the vehicle is obtained based on the rotational velocities of the four wheels.

The door opening/closing switch 172 is configured to detect opening and closing of a door of the vehicle. The switch 172 may be configured to either detect the opening/closing of a door of a vehicle-operator side or detect the opening/closing of any one of the other doors. The door opening/closing switch 172 may be constituted by a door courtesy lamp switch of the vehicle.

The ignition switch (IGSW) 174 is a main switch of the vehicle.

Further, to the output portion 152, there are connected, for example, the pump-motor ECU 57 and solenoids of all of the electromagnetic valves (hereinafter simply referred to as "all the electromagnetic valves" where appropriate) which are included in the brake circuit such as the pressure-increasing linear control valve 112, pressure-reducing linear control valve 116, pressure holding valves 103, pressure reducing valves 106, master cut-off valves 134 and simulator controlling valve 142.

Moreover, the memory portion 153 stores therein, for example, various programs and tables.

The pump-motor ECU 57 is also constituted by a computer including an executing portion, a memory portion, an input portion and an output portion. To the input portion, there are connected the above-described input portion 151, output portion 152 and CPU 150 of the brake ECU 56 and the brake switch 158. To the output portion 152, a drive circuit (not shown) of the pump motor 55 is connected.

In the pump-motor ECU 57, states of the input portion 151, output portion 152 and CPU 150 of the brake ECU 56 (e.g., electric signals representing electric current value and voltage value) are detected, and it is judged whether or not each of these components is being activated normally.

As described below, the pump-motor ECU 57 is configured to control the pump motor 55, for example, in the event of failure of the brake ECU 56. The pump-motor ECU 57 is configured to start controlling the pump motor 55 upon satisfaction of failure-state control starting condition. This failure-state control starting condition is satisfied, for example, (1) when the pump-motor ECU 57 receives, from the brake ECU 56, information representing failure of the control system of the brake system, during the ON state of the brake switch 158, and (2) when the brake ECU 56 is not activated normally (e.g., in the event of failure of the brake ECU 56 as such, in the event of breaking of the signal wires between the brake ECU 56 and the sensors, and in the event of breaking of the signal wires between the brake ECU 56 and the solenoids of the valves), during the ON state of the brake switch 158.

<Initial Checks>

In the present embodiment, checks are carried out upon satisfaction of a predetermined check starting condition. This check starting condition is satisfied, for example, when the door opening/closing switch 172 is turned to the ON state, and when a brake operation is carried out for the first time after the ignition switch 174 has been turned to the ON state.

Figure 5:
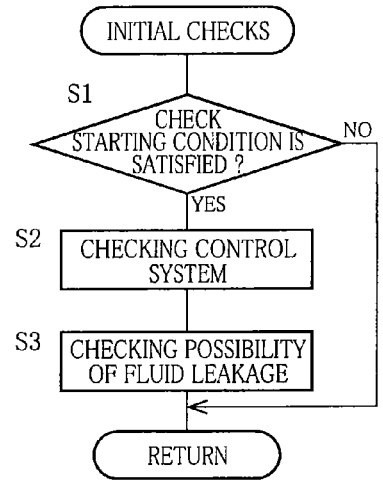
FIG. 5 is a flow chart representing an initial-check program stored in a memory portion of a brake ECU that is included in the hydraulic brake system.

FIG. 5 is a flow chart showing an initial checking program that is executed at a predetermined time interval. The execution of this initial checking program is initiated with step S1 that is implemented to judge whether the predetermined check starting condition is satisfied or not. When the check starting condition is satisfied, step S2 is implemented to check the control system, and step S3 is implemented to check possibility of fluid leakage. The control system includes components, such as the sensors and the electromagnetic valves, which are used for controlling the hydraulic pressure in each of the brake cylinders.

For detecting failure of the control system, for example, it is judged whether or not there is a breaking of wire for each of all the electromagnetic valves, and it is judged whether or not there is a breaking of wire for each of all the sensors (e.g., brake switch 158, stroke sensor 160, master-cylinder pressure sensor 162, accumulator pressure sensor 164, brake-cylinder pressure sensor 166, wheel velocity sensor 170).

The possibility of the fluid leakage is checked, for example, when the ignition switch 174 is turned to the ON state, and when the brake operation is carried out. It is judged that there is no fluid leakage, for example, (a) when the level warning switch 168 is in the ON state, and (b) when there is established a predetermined relationship between the stroke of the brake pedal 60 and the hydraulic pressure in the master cylinder 62 upon execution of the brake operation. On the other hand, it is judged that there is a possibility of fluid leakage, when the hydraulic pressure in the master cylinder 62 is low relative to the stroke of the brake pedal 60. Further, it is judged that there is a possibility of fluid leakage, (c) when a value detected by the accumulator pressure sensor 164 does not reach a fluid-leakage-judgment threshold value even after continuation of activation of the pump 90 for a predetermined length of time, (d) when the value detected by the brake-cylinder pressure sensor 164 is low relative to a value detected by the master-cylinder pressure sensor 162 while the regenerative cooperative control is not being carried out, and (e) when it was judged that there was a possibility of fluid leakage upon previous brake activation (when the hydraulic pressure in the master cylinder 62 was supplied to the brake cylinders 42 for the front right and left wheels 4, 2, while the pump pressure was supplied to the brake cylinders 52 for the rear right and left wheels 48, 46).

Thus, in the present embodiment, the possibility of the fluid leakage is detected based on the above-described conditions (a)-(e). There is a case where a fluid leakage does not actually take place even when it is judged that there is a possibility of the fluid leakage, because the above-described conditions (b)-(e) could be satisfied by a factor other than the fluid leakage. Further, there is a case where an amount of the fluid leakage is small when the fluid leakage actually takes place. However, even in these cases, it is judged that there is a possibility of the fluid leakage, because it is not possible to assert that there is no possibility of the fluid leakage.

<Brake Hydraulic Pressure Control>

Figure 6:
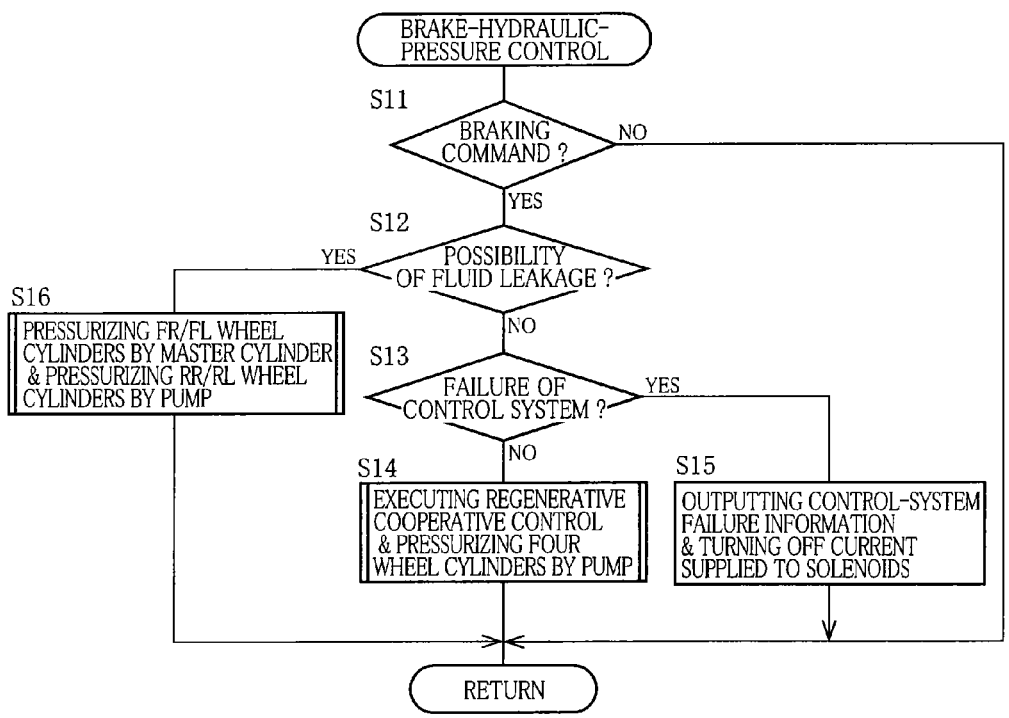
FIG. 6 is a flow chart representing a brake-hydraulic-pressure control program stored in the memory portion of the brake ECU.

Then, the hydraulic pressures in the brake cylinders 42, 52 are controlled based on result of the above-described initial checks. FIG. 6 is a flow chart representing a brake-hydraulic-pressure controlling program that is executed at a predetermined time interval.

In step S11, it is judged whether a braking command is issued or not. A positive judgment (YES) is obtained in step S11, for example, when the brake switch 158 is in the ON state, and when a command requesting activation of an automatic brake is issued. Since there is a case where the automatic brake is activated upon execution of a traction control and upon execution of a vehicle stability control, it is judged that the braking command is issued upon satisfaction of conditions required for starting the traction control and the vehicle stability control.

When it is judged that the braking command is issued, the control flow goes to steps S12 and S13 that are implemented to read results of the judgment as to whether or not there is a possibility of the fluid leakage and the judgment as to whether or not the control system suffers from the failure.

When negative judgments (NO) are obtained in both of these judgments, namely, when the brake system functions normally (i.e., when it is judged that the control system functions normally and that there is no possibility of the fluid leakage), the control flow goes to step S14 that is implemented to carry out a regenerative cooperative control.

When it is judged that the control system suffers from the failure, namely, when a positive judgment (YES) is obtained in step S13, the control flow goes to step S15 in which supply of the electric current to the solenoids of all the electromagnetic valves is stopped so that all the electromagnetic valves are placed in the respective original positions as shown in FIG. 2. Further, in step S15, information representing the failure of the control system is supplied to the pump-motor ECU 57.

When it is judged that there is a possibility of the fluid leakage, namely, when a positive judgment (YES) is obtained in step S12, the control flow goes to step S16 in which the hydraulic pressure in the master cylinder 62 is supplied to the brake cylinders 42 for the front right and left wheels 4, 2 while the hydraulic pressure controlled by the output hydraulic-pressure control device 118 is supplied to the brake cylinders 52 for the rear right and left wheels 48, 46.

It is rare that the control system suffers from the failure and also there is a possibility of the fluid leakage. Therefore, when it is judged that there is a possibility of the fluid leakage, it is regarded that the control system functions normally thereby making it possible to control the electromagnetic valves and to activate the pump motor 55.

Thus, in the present embodiment, the regenerative cooperative control is not carried out, when the control system is in failure and when there is a possibility of fluid leakage.

Further, in the event of failure of the brake system as a whole, for example, in case of failure of supply of electric energy due to break down of the power supply voltage, the pump motor 55 is stopped and the electromagnetic valves are placed in the respective original positions.

1) In Case of Normality of System

To the brake cylinders 42, 52 for the four wheels 4, 2, 48, 46, the controlled hydraulic pressure (i.e., fluid pressurized by the pump) is supplied from the second hydraulic-pressure generating device 64, so that the regenerative cooperative control is in principle executed.

The regenerative cooperative control is executed for equalizing an actual total braking torque to a total required braking torque, wherein the actual total braking torque is a sum of the regenerative braking torque applied to the driving wheels 2, 4 and a friction braking torque applied to the driven wheels 46, 48 as well as to the driving wheels 2, 4.

The total required braking torque is determined in the brake ECU 56. The total required braking torque corresponds to a braking torque required by the vehicle operator, when the total required braking torque is obtained based on values detected by the stroke sensor 160 and the master-cylinder pressure sensor 162. The total required braking torque corresponds to a braking torque required in the traction control or vehicle stability control, when the total required braking torque is obtained based on a running state of the vehicle. Then, a required regenerative braking torque is determined based on the above-described total required braking torque and information which is supplied from the hybrid ECU 58 and which contains data indicative of a generator-side upper limit value and a storage-side upper limit value. The generator-side upper limit value is an upper limit value of the regenerative braking torque, which is dependent on, for example, number of rotations of the driving motor 20, while the storage-side upper limit value is an upper limit value of the regenerative braking torque, which is dependent on, for example, a storage capacity of the storage device 22. That is, the smallest one of the total required braking torque (required value), generator-side upper limit value and storage-side upper limit value is determined as the required regenerative braking torque, and then information representing the determined required regenerative braking torque is supplied to the hybrid ECU 58.

The hybrid ECU 58 supplies information representing the required regenerative braking torque, to the driving-motor ECU 28.

The driving-motor ECU 28 supplies a control command to the conversion device 26 such that the braking torque applied to the front right and left wheels 4, 2 by the driving motor 20 is made equal to the required regenerative braking torque. In this instance, the driving motor 20 is controlled by the conversion device 26.

The driving-motor ECU 28 supplies information representing activation state of the driving motor 20 such as an actual number of revolutions, to the hybrid ECU 58. In the hybrid ECU 58, an actual regenerative braking torque is obtained based on the actual activation state of the driving motor 20, and information representing a value of the actual regenerative braking torque is supplied to the brake ECU 56.

The brake ECU 56 determines a required hydraulic braking torque based on, for example, a value obtained by subtracting the actual regenerative braking torque from the total required braking torque, and then controls valves such as the pressure-increasing linear control valve 112 and pressure-reducing linear control valve 116, such that the brake cylinder hydraulic pressure becomes close to a target hydraulic pressure that establishes the required hydraulic braking torque.

Figure 7:
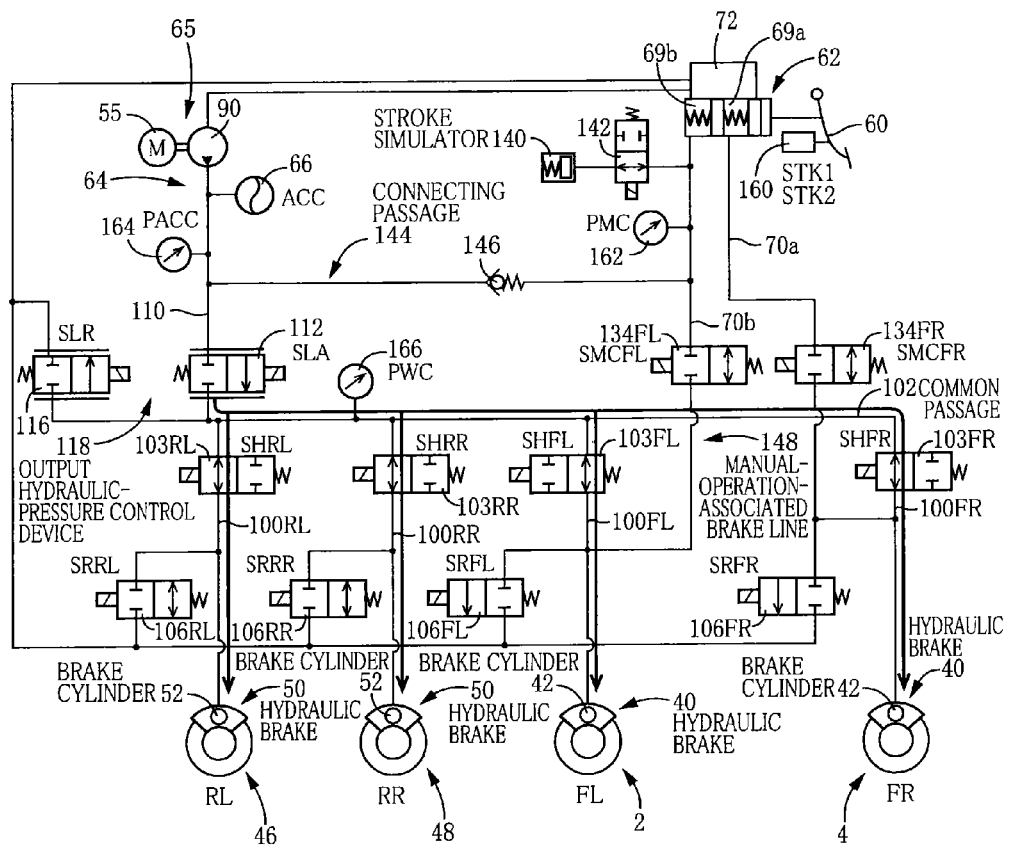
FIG. 7 is a view showing a state upon execution of the brake-hydraulic-pressure control program in the hydraulic brake system (in case of normality of the system).

During the regenerative cooperative control, in principle, all the pressure holding valves 103FR, 103FL, 103RR, 103RL provided for the respective four wheels 4, 2, 48, 46 are placed in the open states while all the pressure reducing valves 106FR, 106FL, 106RR, 106RL provided for the respective four wheels 4, 2, 48, 46 are placed in the closed states, as shown in FIG. 7. Further, the master cut-off valves 134FR, 134FL are placed in the closed states, while the simulator controlling valve 142 is placed in the open state. The brake cylinders 42FR, 42FL provided for the front right and left wheels 4, 2 are isolated from the master cylinder 62, and the brake cylinders 42, 52 provided for the front right, front left, rear right and rear left wheels 4, 2, 48, 46 are in communication with the common passage 102. The pressure-increasing linear control valve 112 and the pressure-reducing linear control valve 116 are controlled so as to control hydraulic pressure, and the controlled hydraulic pressure is supplied to the common passage 102 and the brake cylinders 42, 52 provided for the respective four wheels.

In this state, if a braking slip of the wheels 2, 4, 46, 48 is excessively large so as to satisfy an anti-lock control starting condition, the pressure holding valves 103 and pressure reducing valves 106 are opened or closed independently of one another whereby the hydraulic pressure in each of the brake cylinders 42, 52 is controlled, so that a slipping state of each of the front right, front left, rear right and rear left wheels 4, 2, 48, 46 is optimized. In principle, the pressure holding valve 103 and the pressure reducing valve 106, which are provided for an excessively slipping wheel, are controlled. However, in the anti-lock control, there is a case where the pressure holding valve 103 and the pressure reducing valve 106, which are provided for a non-excessively slipping wheel, are also controlled. In any case, the pressure holding valves 103 and the pressure reducing valves 106 are valves that are to be subjected to a wheel slip control such as the anti-lock control.

Further, in a case where the hydraulic brake system is installed on a vehicle which is not provided with the electric drive device 6, i.e., on a vehicle in which the regenerative cooperative control is not executed, the output hydraulic-pressure control device 118 is controlled such that the hydraulic braking torque is made equal to the total required braking torque.

2) In Case of Failure of Control System (Including Case of Failure of Brake ECU 56)

Figure 8:
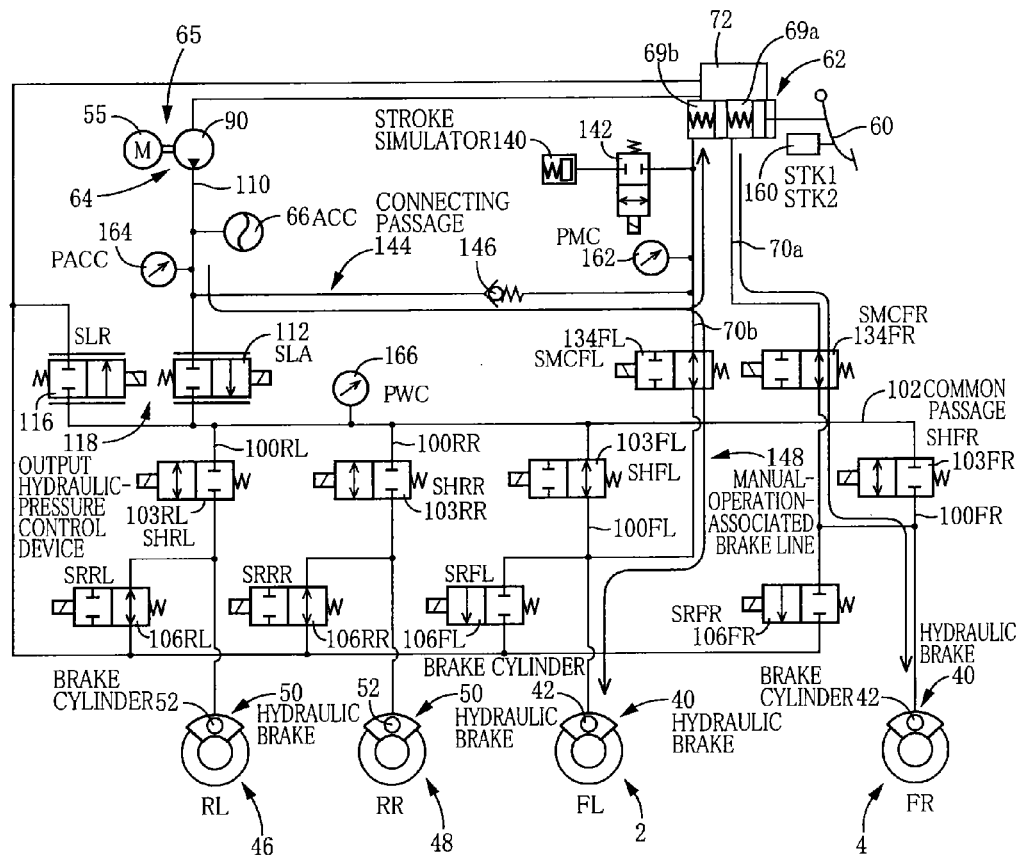
FIG. 8 is a view showing another state upon execution of the brake-hydraulic-pressure control program in the hydraulic brake system (in case of failure of a control system of the brake system).
Figure 10:
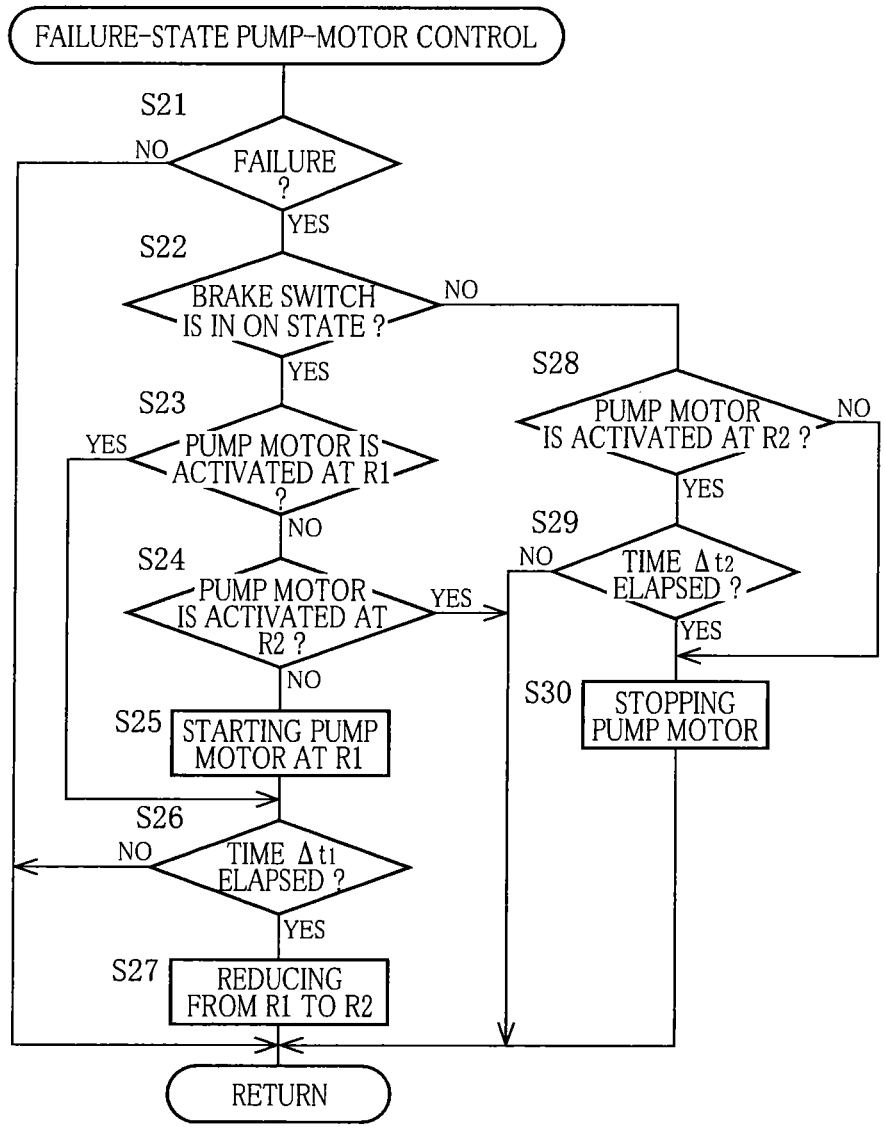
FIG. 10 is a flow chart showing a failure-state pump-motor control program stored in a memory portion of a pump motor ECU that is included in the hydraulic brake system.

In case of failure of the control system, all the electromagnetic valves are placed back in the respective original positions, as shown in FIG. 8, and the pump motor 55 is controlled in accordance with a failure-state pump-motor control program that is represented by flow chart of FIG. 10.

The pressure-increasing linear control valve 112 and the pressure-reducing linear control valve 116 are placed in the closed states, by not supplying the electric current to the solenoids 126, whereby the second hydraulic-pressure generating device 64 is isolated from the common passage 102.

The pressure holding valve 103FL is placed in the open state while the pressure holding valves 103FR, 103RR, 103RL are placed in the closed states. The pressure reducing valves 106FR, 106FL provided for the front right and left wheels 4, 2 are placed in the closed states, while the pressure reducing valves 106RR, 106RL provided for the rear right and left wheels 48, 46 are placed in the open states. The first and second master cut-off valves 134FR, 134FL are placed in the open states.

In a case where the pump motor 55 can be normally activated in spite of the failure of the control system, the pump motor 55 is controlled by the pump-motor ECU 57 so as to be activated in accordance with a predetermined pattern whereby the working fluid is discharged from the pump 90.

When a pressure difference between the hydraulic pressure of the working fluid discharged from the pump 90 and the hydraulic pressure in the second master cylinder passage 70b becomes larger than the above-described given value Pr, the relief valve 146 is switched from the closed state to the open state whereby the working fluid discharged from the pump 90 is supplied to the second master cylinder passage 70b. The hydraulic pressure supplied to the second master cylinder passage 70b is supplied to the brake cylinder 42FL provided for front left wheel 2 via the second master cut-off valve 134FL that is placed in the open state, and is supplied also to the second pressurizing chamber 69b.

The hydraulic pressure of the working fluid supplied to the second pressurizing chamber 69b is lower than the hydraulic pressure of the working fluid discharged from the pump 90 by the above-described given value Pr of the relief valve 146.

Meanwhile, by operation of the brake pedal 60, the hydraulic pressures are generated in the first and second pressurizing chambers 69a, 69b of the master cylinder 62. Since the pressure holding valve 103FL and the second master cut-off valve 134FL are being placed in the open states, the hydraulic pressure in the second pressurizing chamber 69b and the hydraulic pressure in the common passage 102 are equal to each other. When the hydraulic pressure discharged from the pump 90 become higher than the hydraulic pressure in the common passage 102 and the hydraulic pressure in the second pressurizing chamber 69b by the above-described given value Pr, the relief valve 146 rather than the pressure-increasing linear control valve 112 is switched from the closed state to the open state.

With increase of the hydraulic pressure in the second pressurizing chamber 69b, the second pressurizing piston 68b is forced to be moved rearwardly whereby the hydraulic pressure in the first pressurizing chamber 69a is increased. The increased hydraulic pressure in the first pressurizing chamber 69a is supplied via the first master cylinder passage 70a to the brake cylinder 42FR provided for the front right wheel 4. Since the pressure holding valve 103FR is placed in the closed state, the brake cylinder 42FR is isolated from the common passage 102 whereby the hydraulic pressure in the brake cylinder 42FR provided for the front right wheel 4 is increased.

In the present embodiment in which the extension limiting portion 77 is disposed between the first and second pressurizing pistons 68a, 68b of the master cylinder 62, the forward movement of the second pressurizing piston 68b is limited by the extension limiting portion 77 even if the working fluid is supplied to the first pressurizing chamber 69a. On the other hand, the rearward movement of the second pressurizing piston 68b is not limited by the extension limiting portion 77. In view of this, the hydraulic pressure is supplied to the second pressurizing chamber 69b that is located on the front side of the second pressurizing piston 68b.

There will be described a reason why the hydraulic pressure in each of the first and second pressurizing chambers 69a, 69b is increased by supplying the hydraulic pressure to the second pressurizing chamber 69b, even without changing a magnitude of the operating force applied to the brake pedal 60.

The following expressions (1), (2) represent hydraulic pressures Pmca, Pmcb, which are generated in the respective first and second pressurizing chambers 69a, 69b of the master cylinder 62 when the brake pedal 60 is depressed.

$$Pmca \cdot A = F - Fsa - F\mu a \qquad (1)$$

$$Pmcb \cdot A = Pmca\ A - (Fsb - Fsa) - F\mu b \qquad (2)$$

In the above expressions, "A" represents a pressure receiving area of each of the first and second pressurizing pistons 68a, 68b (the pressure receiving areas of the respective first and second pressurizing pistons 68a, 68b are equal to each other in the present embodiment), and "F" represents a force (hereinafter simply referred to as "operating force") applied to the first pressurizing piston 68a as a result of the operating force applied to the brake pedal 60. Further, "Fsa"

and "Fsb" are biasing forces of the respective springs 73a, 73b, and "Fμa" and "Fμb" are friction forces generated between the housing 67 and the respective pressurizing pistons 68a, 68b.

Figure 9A:
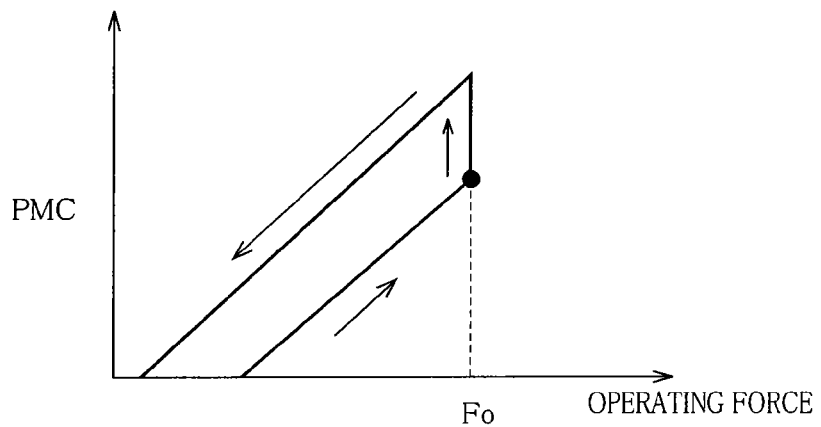
FIG. 9A is a view showing a relationship between an operating force and hydraulic pressure in a master cylinder when a pump motor is controlled in case of failure of the control system of the brake system.
Figure 9B:
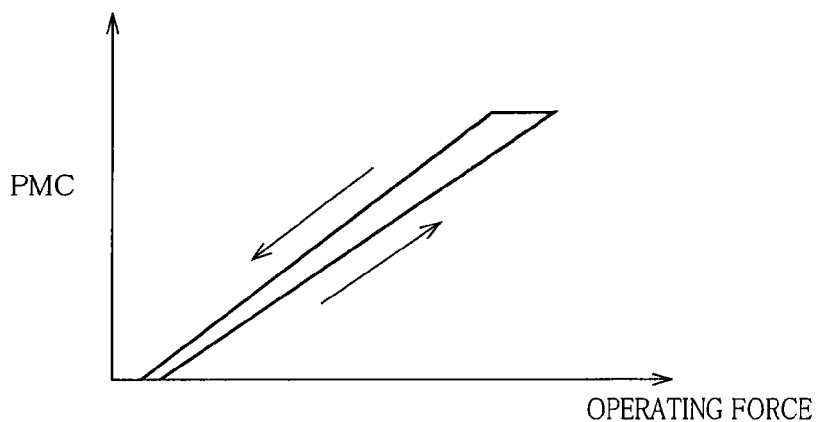
FIG. 9B is a view showing a relationship between the operating force and the hydraulic pressure in the master cylinder when the pump motor is not being controlled.

Normally, as shown in FIG. 9B, there is established a hysteresis relationship between the operating force F and each of the hydraulic pressures Pmca, Pmcb of the respective first and second pressurizing chambers 69a, 69b, due to the friction force generated between the housing 67 and a corresponding one of the pressurizing pistons 68a, 68b.

Described specifically, with increase of the operating force F, each of the first and second pressurizing pistons 68a, 68b is moved forwardly against the friction force. With reduction of the operating force F, each of the first and second pressurizing pistons 68a, 68b is moved back, since the hydraulic pressure in a corresponding one of the first and second pressurizing chambers 69a, 69b acts on each of the first and second pressurizing pistons 68a, 68b in the reverse direction. In this instance, the friction force acts in one of opposite directions upon increase of the operating force F, and acts in the other of the opposite directions upon reduction of the operating force F. Therefore, even when the operation force is reduced after being held constant, the hydraulic pressure in each of the first and second pressurizing chambers 69a, 69b is held constant due to hysteresis corresponding to the friction force.

When the hydraulic pressure is supplied to the second pressurizing chamber 69b by controlling the pump motor 55, the first and second pressurizing pistons 68a, 68b are forced to be moved rearwardly.

The following expressions (3), (4) represent hydraulic pressures Pmca', Pmcb', which are generated in the respective first and second pressurizing chambers 69a, 69b of the master cylinder 62.

$$Pmca' \cdot A = F - Fsa + F\mu a \quad (3)$$

$$Pmcb' \cdot A - F\mu b = Pmca' \cdot A - (Fsb - Fsa). \quad (4)$$

As is clear from comparison of the expressions (3), (4) with the expressions (1), (2), the hydraulic pressures in the respective first and second pressurizing chambers 69a, 69b represented by the expressions (3), (4) are higher than those represented by the expressions (1), (2), as long as a magnitude of the operating force F is the same.

$$Pmca' > Pmca$$

$$Pmcb' > Pmcb$$

FIG. 9A shows, by way of example, an assumed case in which the hydraulic pressure is supplied to the second pressurizing chamber 69b when the operating force F is $F_0$. As is apparent from FIG. 9A, in this case, even while the operating force F is held at $F_0$, the hydraulic pressure in each of the first and second pressurizing chambers 69a, 69b is made higher, by a magnitude corresponding to the friction force, than where the hydraulic pressure is not supplied to the second pressurizing chamber 69b.

Figure 9C:
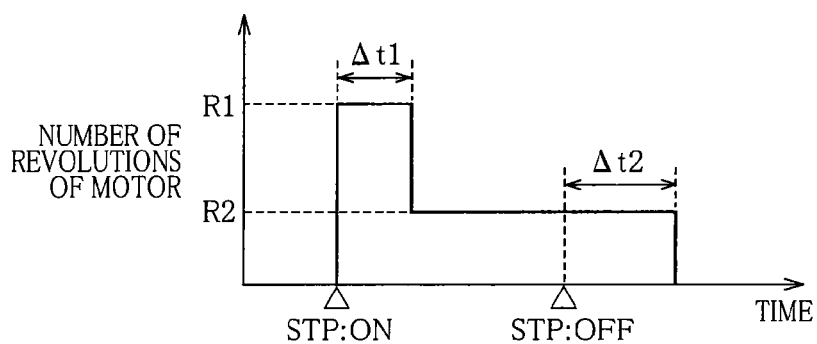
FIG. 9C is a view schematically showing a pattern for controlling the pump motor in case of failure of the control system of the brake system.

In the present embodiment, the number of revolutions of the pump motor 55 is controlled in accordance with a pattern indicated in FIG. 9C. According to this pattern, the number of revolutions is set at a first number of revolutions R1 upon satisfaction of the failure-state control starting condition, and is held at the first number of revolutions R1 for a first predetermined time Δt1. Then, after elapse of the first predetermined time Δt1, the number of revolutions is set at a second number of revolutions R2 which is smaller than first number of revolutions R1 (R2<R1). Then, when a second predetermined time Δt2 elapses after the brake switch 158 has been turned to the OFF state, it is judged that a failure-state control terminating condition whereby the pump motor 55 is stopped.

The first number of revolutions R1 is an amount enabling the discharge pressure of the pump 90 to be increased to a value which enables the relief valve 146 to be rapidly switched from the closed state to the open state, and which enables the hydraulic pressure to be supplied to the second pressurizing chamber 69b.

The first predetermined time Δt1 is a length of time that is required for enabling the pump 90 to discharge the working fluid at a high rate.

After the discharge pressure of the pump 90 has reached to the value enabling the relief valve 146 to open, the number of revolutions is reduced to the second number of revolutions R2 since the flow rate of the working fluid discharged from the pump 90 is not required to be increased. That is, the flow rate of the working fluid discharged from the pump 90 is held substantially at a given value, so that the flow rate of the working fluid supplied to the mater cylinder 62 is held substantially at a given value.

Since the brake pedal 60 is not completely returned to its original position even after the brake switch 158 has been turned to the OFF state, the pump motor 55 is kept activated even after the brake switch 158 has been turned to the OFF state, for preventing reduction of the braking force as long as the brake pedal 60 is not yet completely returned to the original position.

That is, during activation of the pump 90, with reduction of the operating force F applied to the brake pedal 60, the first and second pressurizing pistons 68a, 68b are moved rearwardly so that the pressure reservoir cut-off valves 82, 83 are switched from the closed states to the open states. As the pressure reservoir cut-off valves 82, 83 are placed in the open states, the first and second pressurizing chambers 69a, 69b are brought into communication with the reservoir 72 whereby the hydraulic pressures in the first and second pressurizing chambers 69a, 69b are reduced. When the operating force F is increased again, the first and second pressurizing pistons 68a, 68b are moved forwardly, so that the pressure reservoir cut-off valves 82, 83 are switched from the open states to the closed states whereby the hydraulic pressures in the first and second pressurizing chambers 69a, 69b are increased. Thus, in the present embodiment, the second number of revolutions R2 is an amount which enables the communication and isolation of the first pressurizing chamber 69a and the reservoir 72 to be controlled by the operating force F, and which enables the hydraulic pressures in the first and second pressurizing chambers 69a, 69b to be controlled by the operating force F.

The following expressions (5), (6), (7) represent hydraulic pressures Pmca", Pmcb", which are generated in the respective first and second pressurizing chambers 69a, 69b of the master cylinder 62. It is noted that, in the following expressions, "Ag" represents an opening area of the reservoir cut-off valve 82, "Cd" represents a flow rate coefficient of the working fluid flowing along a communication passage, and "Q" represents an amount of the working fluid flowing along the communication passage.

$$Pmca'' \cdot A = F - Fsa + F\mu a \quad (5)$$

$$Pmcb'' \cdot A - F\mu b = Pmca'' \cdot A - (Fsb - Fsa) \quad (6)$$

$$Q = Cd \cdot Ag \cdot (2 \cdot Pmca''/\rho)^{1/2} \quad (7)$$

From the expressions (5), (6), (7), it is understood that the hydraulic pressures Pmca", Pmcb" in the first and second pressurizing chambers 69a, 69b can be adjusted by adjusting the opening area Ag of the reservoir cut-off valve 82 in a state where the flow amount Q is held constant.

The failure-state pump-motor control program represented by the flow chart of FIG. 10 is executed at a predetermined time interval.

This control program is initiated with step S21 that is implemented to judge whether a control-system failure information is supplied or not, and to judge whether the brake ECU 56 suffers from a failure or not. Hereinafter, the failure of each of the control system and the brake ECU 56 will be simply referred to as "failure" where appropriate. In case of the failure, step S22 is implemented to judge whether the brake switch 158 is in the ON state. When the brake switch 158 is in the ON state, the control flow goes to steps S23 and S24. In step S23, it is judged whether or not the pump motor 55 is activated at the first number of revolutions R1. In step S24, it is judged whether or not the pump motor 55 is activated at the second number of revolutions R2. When the pump motor 55 is in its stopped state, the control flow goes to step S25 in which the pump motor 55 starts to be rotated at the first number of revolutions R1. Step S25 is followed by step S26 in which it is judged whether the first predetermined time Δt1 has elapsed or not. When step S26 is implemented for the first time, a negative judgment (NO) is obtained whereby the control flow goes back to step S21.

In this instance, since the pump motor 55 is rotated at the first number of revolutions R1, a positive judgment (YES) is obtained in step S23 if the brake switch 158 is in the ON state. The control flow goes to step S26 in which it is judged whether the first predetermined time Δt1 has elapsed or not. Steps S21, S22, S23, S26 are implemented repeatedly until the first predetermined time Δt1 elapses. When the first predetermined time Δt1 has elapsed, a positive judgment (YES) is obtained in step S26, whereby the control flow goes to step S27 in which the number of rotations of the pump motor 55 is reduced to the second number of revolutions R2.

When the pump motor 55 is rotated at the second number of revolutions R2 with the brake switch 158 being placed in the ON state, a positive judgment (YES) is obtained in step S24, and the second number of revolutions R2 of the pump motor 55 is maintained.

When the brake switch 158 is turned from the ON state to the OFF state after the repeated implementations of steps S21-S24, a negative judgment (NO) is obtained in step S22, and the control flow goes to step S28 that is implemented to judge whether or not the pump motor 55 is rotated at the number of revolutions R2. When the pump motor 55 is rotated at the number of revolutions R2, step S28 is followed by step S29 that is implemented to judge whether the second predetermined time Δt2 has elapsed or not. Steps S21, S22, S28, S29 are implemented repeatedly until the second predetermined time Δt2 elapses. When the second predetermined time Δt2 has elapsed, a positive judgment (YES) is obtained in step S29, and the control flow goes to step S30 in which the pump motor 55 is stopped.

On the other hand, after the pump motor 55 has started to be activated, when the brake switch 158 is turned from the ON state to the OFF state before elapse of the first predetermined time Δt1, a negative judgment (NO) is obtained in step S28 whereby step S30 is implemented to stop the pump motor 55.

In a state in which the brake switch 158 is placed in the OFF state with the pump motor 55 being stopped, steps S21, S22, S28, S30 are repeatedly implemented even in case of the failure, whereby the pump motor 55 is held in the stopped state.

As described above, in the present embodiment, in case of the failure of the control system, the pump motor 55 is activated so that the hydraulic pressures in the brake cylinders 42FR, 42FL can be made higher than the hydraulic pressure corresponding to the operating force F (i.e., the hydraulic pressures in the first and second pressurizing chambers 69a, 69b where there is no flow of the hydraulic pressure back to the second pressurizing chamber 69b). It is possible to restrain reduction of the hydraulic braking torque also when the regenerative braking torque is not being applied to each of the wheels.

Further, as compared with an arrangement in which the working fluid is supplied to the common passage 102 via the pressure-increasing linear control valve 112 in case of the failure of the control system, it is possible to reduce the number of times at which a large pressure difference is established between the high-pressure and low-pressure sides of the pressure-increasing linear control valve 112, thereby leading to prolongation of service life of the pressure-increasing linear control valve 112.

Moreover, the provision of the accumulator 66 serves to restrain pulsation that is generated by activation of the pump device 65. Consequently, it is possible to restrain pulsation of the hydraulic pressure supplied to the second pressurizing chamber 69b.

In the present embodiment, since the relief valve 146 and the pressure-increasing linear control valve 112 are disposed in parallel with each other between the second hydraulic-pressure generating device 64 and the manual-operation-associated brake line 148, the hydraulic pressure having been controlled by the pressure-increasing linear control valve 112 is not supplied to the manual-operation-associated brake line 148 via the relief valve 146.

It is noted that the manner of controlling the pump motor 55 in case of detection of failure of the control system is not limited to the details in the present embodiment.

For example, when the failure has been detected, the pump motor 55 may be kept activated even when the brake switch 158 is OFF, so that it is possible to satisfactorily restrain reduction of the hydraulic pressure in each of the brake cylinders 42, 52. When the brake pedal 60 is not being operated, the working fluid supplied to the second pressurizing chamber 69b is allowed to flow out to the reservoir 72.

Further, in the control of the pump motor 55 in event of failure of the control system, the first number of revolutions R1 and the first predetermined time Δt1 may be values that are determined based on the hydraulic pressure of the second hydraulic-pressure generating device 64 (i.e., value detected by the accumulator pressure sensor 164) upon detection of the failure.

Moreover, the second number of revolutions R2, which corresponds to the flow rate of the working fluid discharged from the pump 90, is not necessarily limited to a particular value. For example, the second number of revolutions R2 may be determined based on the operating force applied to the brake pedal 60 by the vehicle operator. For example, the second number of revolutions R2 may be set to a large value when the brake operating force is large, namely, when a large braking force is required.

Figure 11:
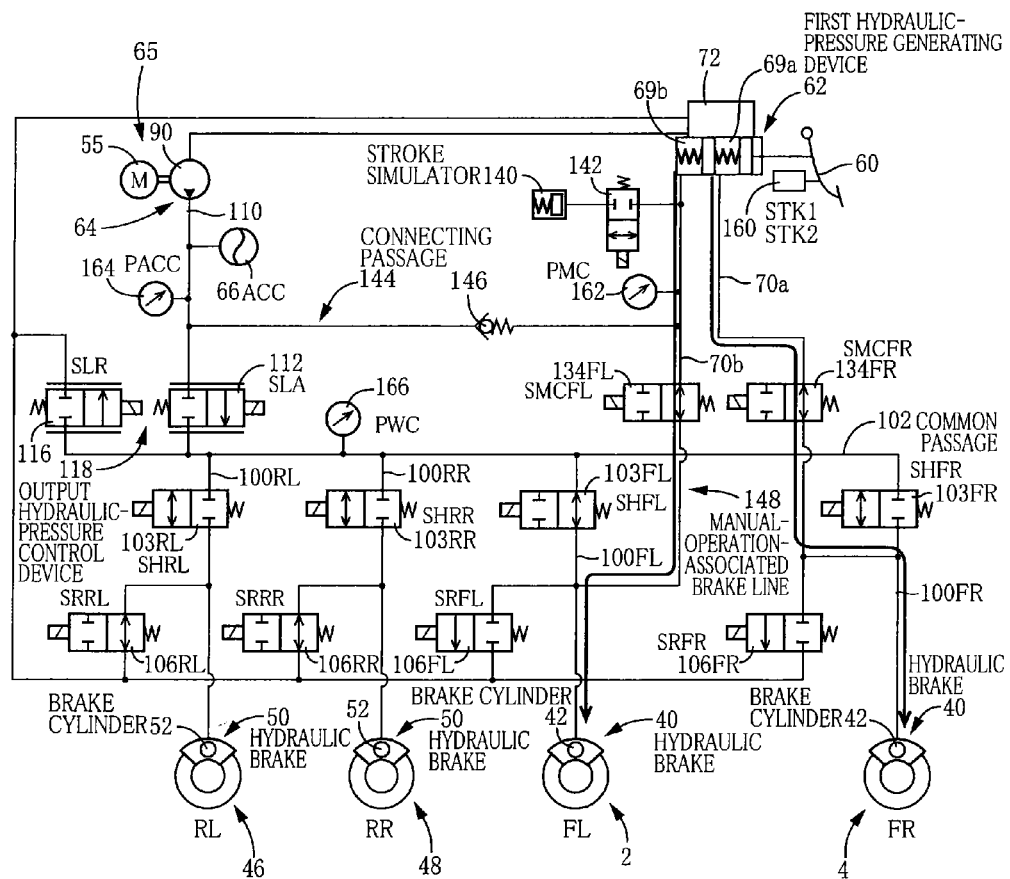
FIG. 11 is a view showing still another state upon execution of the brake-hydraulic-pressure control program in the hydraulic brake system (in case of failure of an electric line of the entirety of the brake system).

On the other hand, in case of failures of both of the brake ECU 56 and the pump-motor ECU 57, and in case of a failure of an electric power source to supply electric energy, all the electromagnetic valves are placed in the original positions as shown in FIG. 11, and the pump motor 55 is stopped. The hydraulic pressures are generated in the first and second pressurizing chambers 69a, 69b of the master cylinder 62 by operation of the brake pedal 60, and are supplied to the brake cylinders 42FR, 42FL via the first and second master cylinder passages 70a, 70b.

3) In Case of Detection of Possibility of Fluid Leakage

Figure 12:
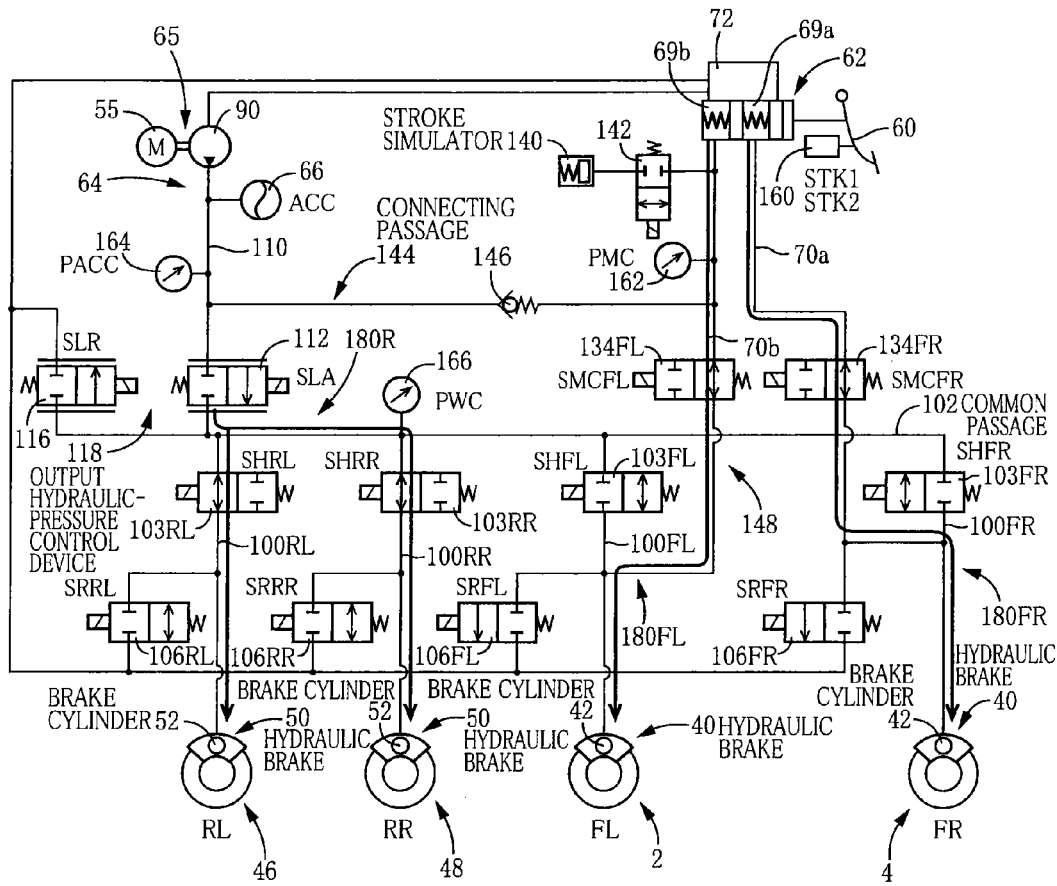
FIG. 12 is a view showing still another state upon execution of the brake-hydraulic-pressure control program in the hydraulic brake system (in case of presence of possibility of fluid leakage).

In a case where it is judged that there is a possibility of fluid leakage, the pressure holding valves 103FR, 103FL provided for the front right and left wheels 4, 2 are placed in the closed states while the pressure holding valves 103RR, 103RL provided for the rear right and left wheels 48, 46 are placed in the open states, as shown in FIG. 12. Further, the first and second master cut-off valves 134FR, 134FL are placed in the open states while the simulator controlling valve 142 is placed in the closed state. Further, all the pressure reducing valves 106 are placed in the closed states.

To the brake cylinders 42FL, 42FR provided for the front left and right wheels 2, 4, the hydraulic pressures supplied from the first and second pressurizing chambers 69b, 69a of the master cylinder 62 are delivered. Meanwhile, to the brake cylinders 52RL, 52RR provided for the rear left and right wheels 46, 48, the controlled hydraulic pressure supplied from the second hydraulic-pressure generating device 64 is delivered.

Thus, to the brake cylinder 42FL provided for the front left wheel 2, the brake cylinder 42FR provided for the front right wheel 4 and the brake cylinders 52RL, 52RR provided for the rear left and right wheels 46, 48, the hydraulic pressures are supplied from the hydraulic pressure sources different from one another, so that even if one of the three brake lines (consisting of a brake line 180FL including the brake cylinder 42FL provided for the front left wheel 2, a brake line 180FR including the brake cylinder 42FR provided for the front right wheel 4, and a brake line 180R including the brake cylinders 52RL, 52RR provided for the rear left and right wheels 46, 48) suffers from the fluid leakage, the other brake lines are hard to be influenced by the fluid leakage taking place in the one of the three brake lines. Thus, at least one of the hydraulic brakes can be more reliably activated.

The brake line 180FL for the front left wheel 2 is constituted by components such as the pressurizing chamber 69b, brake cylinder 42FL, second master cylinder passage 70b and individual passage 100FL, namely, is constituted by a part of the manual-operation-associated brake line 148. The brake line 180FR for the front right wheel 4 is constituted by components such as the pressurizing chamber 69a, brake cylinder 42FR, first master cylinder passage 70a and individual passage 100FR. The brake line 180R for the rear wheels 46, 48 is constituted by components such as the brake cylinders 52RL, 52RR, individual passages 100RL, 100RR, common passage 102, controlled-pressure passage 110 and second hydraulic-pressure generating device 64.

4) In Case of Release of Hydraulic Brake

Upon release of the brake operation, all the electromagnetic valves are placed back in the original positions, as shown in FIG. 2, since electric current is not supplied to the solenoids of the electromagnetic valves.

The hydraulic pressure is returned from the brake cylinders 42FL, 42FR provided for the front left and right wheels 2, 4, to the master cylinder 62 and the reservoir 72, via the first and second master cut-off valves 134FL, 134FR that are placed in the open states. Meanwhile, the hydraulic pressure is returned from the brake cylinders 52RL, 52RR provided for the rear left and right wheels 46, 48, to the reservoir 72, via the pressure reducing valves 106RL, 106RR that are placed in the open states.

As described above, in the present embodiment, the supply of the hydraulic pressure to each of the brake cylinders 42, 52 is controlled based on results of the initial checks.

In case of failure of the control system, the pump motor 55 is activated whereby a higher hydraulic pressure can be supplied to each of the brake cylinders 42FR, 42FL as compared with an arrangement in which the pump motor 55 is placed in the stopped state. Consequently, it is possible to avoid shortage of the braking force for the vehicle as a whole.

In case of possibility of fluid leakage, the three brake lines 180FR, 180FL, 180R are isolated from one another. Therefore, even if the fluid leakage occurs in any one of the three brake lines 180FR, 180FL, 180R, it is possible to satisfactorily avoid the other brake lines from being influenced by the fluid leakage occurring in the one of the brake lines. Further, the hydraulic brakes can be more reliably activated in the brake lines that does not suffer from the fluid leakage.

Moreover, in the present embodiment, the pressure holding valves 103FR, 103RL, 103RR are constituted by the respective normally-close electromagnetic valves. Therefore, in a case when the electric current is not being supplied to the solenoids of the valves, the brake cylinders 42FR, 42FL, 52RR, 52RL can be isolated from one another, so that, even if fluid leakage occurs in any one of the brake cylinders 42FR, 42FL, 52RR, 52RL, it is possible to avoid the other brake cylinders from being influenced by the fluid leakage.

In the hydraulic brake system constructed as described above, a brake hydraulic-pressure control device is constituted by components such as portions of the brake ECU 56 which are assigned to store and execute the brake-hydraulic-pressure control program represented by the flow chart of FIG. 6. Further, a power hydraulic pressure source control device is constituted by components such as portions of the pump motor ECU 57 which are assigned to store and execute the failure-state pump-motor control program represented by the flow chart of FIG. 10. Further, the relief valve 146 corresponds to a flow restraining device.

Further, a manual passage is constituted by the second master cylinder passage 70b and a portion of the individual passage 100FL, wherein the portion of the individual passage 100FL is closer to the brake cylinder 42 than a connected portion of the individual passage 100FL to which the second master cylinder passage 70b is connected.

Moreover, the second master cylinder passage 70b corresponds to one of two front-wheel individual connection passages, the pressure holding valve 103FL corresponds to a front-wheel individual control valve, and the individual passage 100FL corresponds to one of two front-wheel individual passages. Meanwhile, the first master cylinder passage 70a corresponds to the other of the front-wheel individual connection passages, the pressure holding valve 103FR corresponds to another front-wheel individual control valve, and the individual passage 100FR corresponds to the other of the two front-wheel individual passages. The common passage 102 serves also as a front-wheel common passage.

The second hydraulic-pressure generating device 64 serves also as a power hydraulic-pressure generating device or a power hydraulic-pressure generating device with accumulating function.

The master cylinder 62 may be modified such that the extension limiting portion 77 is not provided in the master cylinder 62. In this modification, it is possible to employ an arrangement in which the hydraulic pressure is supplied to the first pressurizing chamber 69a.

Further, the provision of the simulator controlling valve 142 is not essential. Particularly, in a small-sized vehicle in which a capacity of each of the brake cylinders 42, 52 is small, it is not problematic that the working fluid is consumed by the stroke simulator 140.

Embodiment 2

Figure 13:
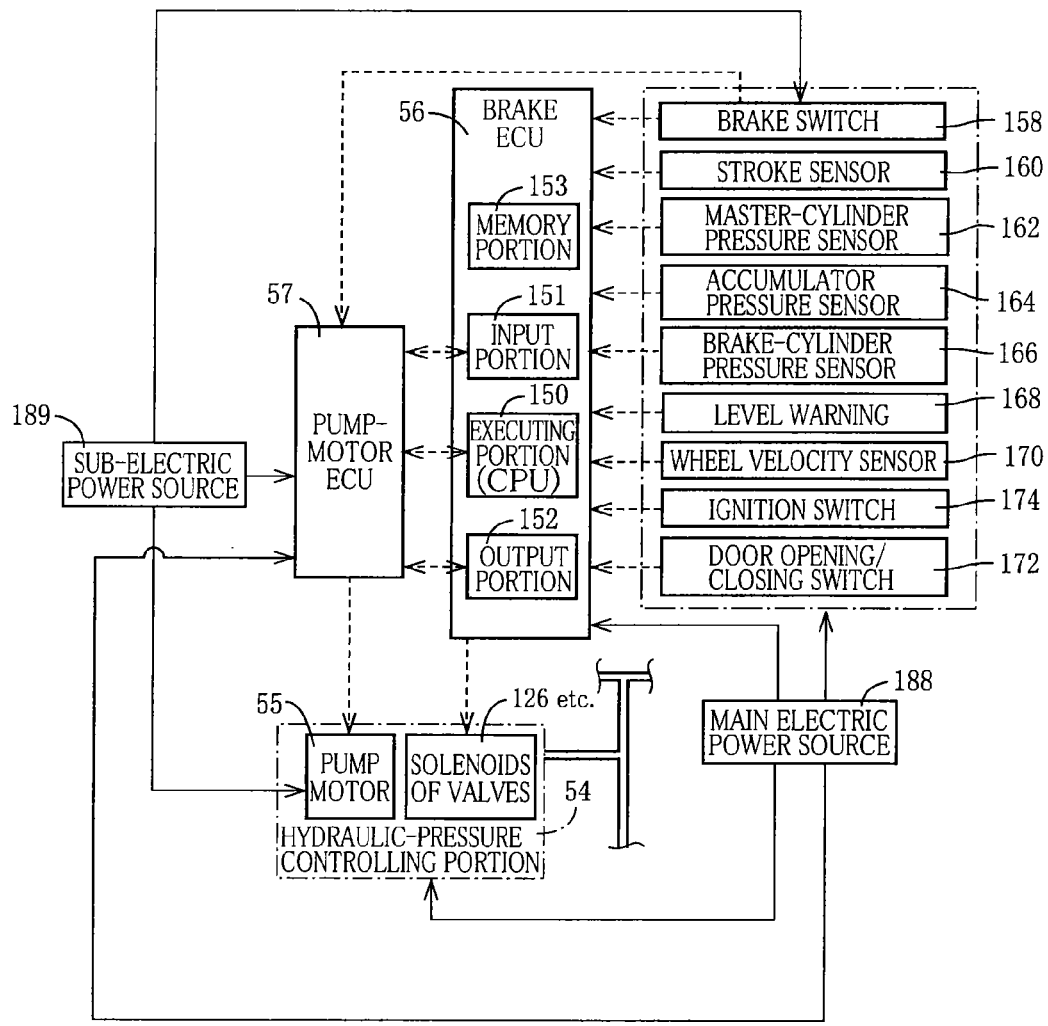
FIG. 13 is a view conceptually showing the brake ECU, pump motor ECU and their neighborhoods of a hydraulic brake system according to an embodiment 2 of the present invention.

In a hydraulic brake system according to Embodiment 2, an electric power source line of the hydraulic brake system is constituted by a double line. FIG. 13 shows an example of the brake system according to Embodiment 2.

In the present embodiment, for example, the brake ECU 56, the sensors 160-174 and the solenoids of all the electromagnetic valves are connected to the main electric power source 188 (that may be constituted by either a device identical with the storage device 22 or a device different from the storage device 22), while the pump-motor ECU 57, the pump motor 55 and the brake switch 158 are connected to both of the main electric power source 188 and the sub-electric power source 189. Therefore, even in a case when electric energy cannot be supplied from the main electric power source 188, or a case when the electric system is in failure, the pump motor 55 can be activated as long as electric energy can be normally supplied from the sub-electric power source 189, whereby the hydraulic pressures in the brake cylinders 42FL, 42FR can be increased.

Embodiment 3

Figure 14:
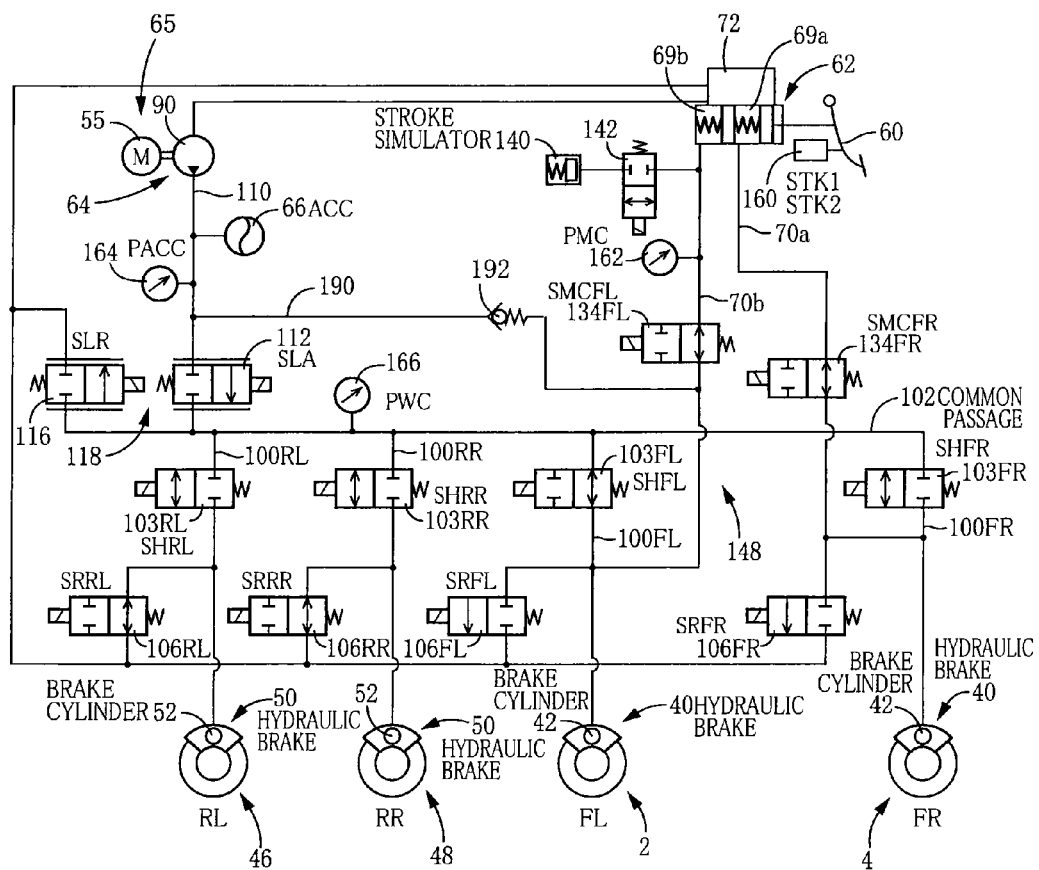
FIG. 14 is a view showing a diagram of a hydraulic circuit included in a hydraulic brake system according to an embodiment 3 of the present invention.

FIG. 14 shows a brake circuit of a hydraulic brake system according to embodiment 3.

In the present embodiment, a connection passage 190 is provided to connect a connected portion of the controlled-pressure passage 110 and a connected portion of the second master cylinder passage 70b. The connected portion of the controlled-pressure passage 110 is located between the pressure-increasing linear control valve 112 and a portion of the controlled-pressure passage 110 to which the accumulator 66 is connected. The connected portion of the second master cylinder passage 70b is closer to the brake cylinder 42 than the second master cut-off valve 134FL. Further, like in Embodiment 1, a relief valve 192 as a flow restraining device is provided in a midway of the connection passage 190.

During activations of the hydraulic brakes 40, 50, the second master cut-off valve 134FL is in principle being placed in the closed state. Therefore, in Embodiment 1, in event of leakage occurring in the relief valve 146, the working fluid is supplied to the second pressurizing chamber 69b, and accordingly a force is applied to the brake pedal 60 whereby an uncomfortable feeling is given to the vehicle operator. Further, since the hydraulic pressures in the pressurizing chambers 69a, 69b are increased irrespective of a stroke distance of the brake pedal 60, the manual hydraulic pressure sources could be erroneously judged as being in failure although they are actually normal.

On the other hand, in the arrangement in which the connection passage 190 is connected onto a downstream side of the second master cut-off valve 134FL, even if the working fluid is supplied from the second hydraulic-pressure generating device 64 to the second master cylinder passage 70b due to the leakage in the relief valve 192, the working fluid is prevented from being supplied to the second pressurizing chamber 69a so that it is possible to reduce the uncomfortable feeling given to the vehicle operator. In this instance, it is not problematic that the working fluid is supplied to the brake cylinder 42. Further, it is possible to prevent the hydraulic pressures in the pressurizing chambers 69a, 69b from being increased relative to the stroke distance of the brake pedal 60 and accordingly prevent the manual hydraulic pressure sources from being erroneously judged as being in failure.

Embodiment 4

Figure 15:
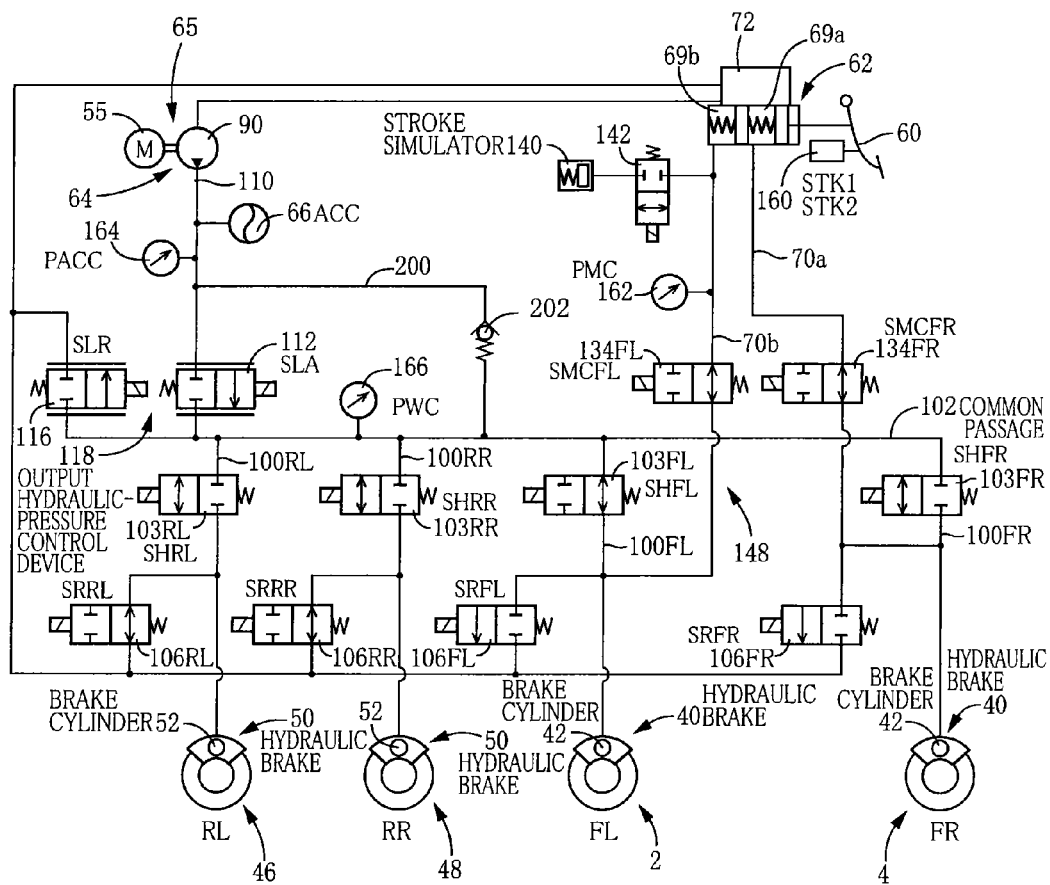
FIG. 15 is a view showing a diagram of a hydraulic circuit included in a hydraulic brake system according to an embodiment 4 of the present invention.

FIG. 15 shows a brake circuit of a hydraulic brake system according to Embodiment 4.

In the present embodiment, the second hydraulic-pressure generating device 64 and the common passage 102 are connected through a connection passage 200 that bypasses the pressure-increasing linear control valve 112. A relief valve 202 (which is substantially identical with that in Embodiment 1) as a flow restraining device is disposed in a midway of the connection passage 200. In the present embodiment, the pressure-increasing linear control valve 112 and the relief valve 202 are disposed in parallel with each other between the second hydraulic-pressure generating device 64 and the common passage 102.

Figure 16:
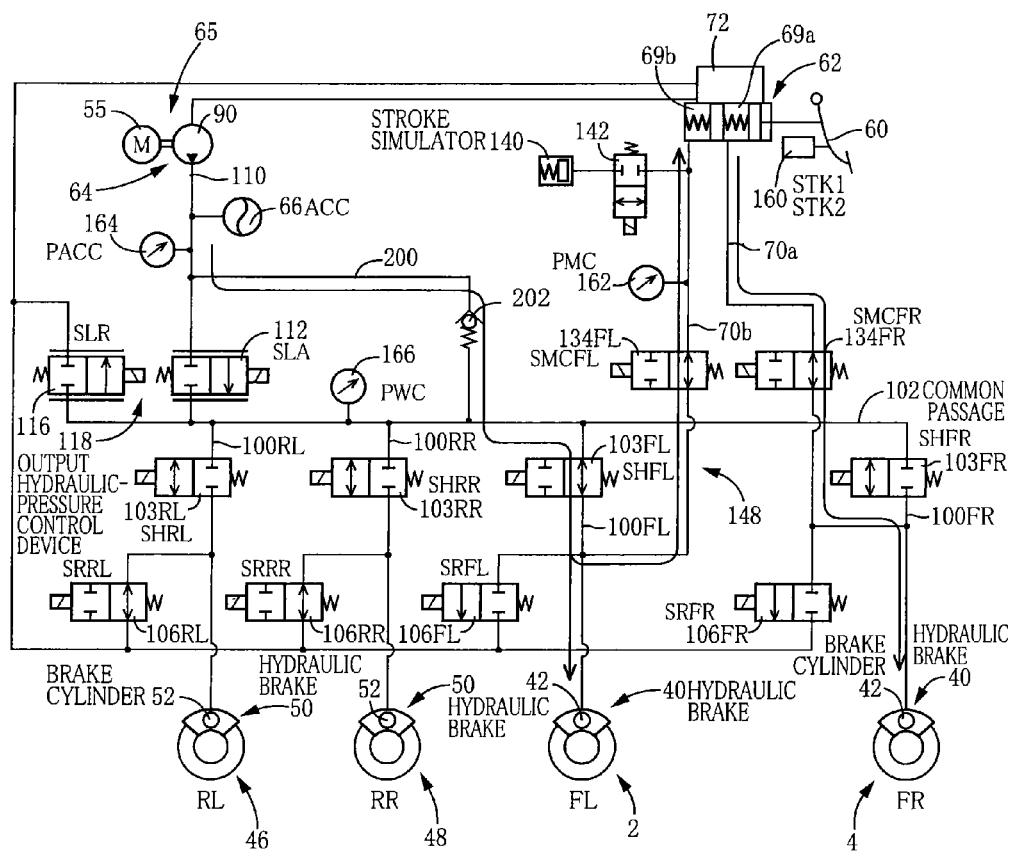
FIG. 16 is a view showing a state in the above-described hydraulic brake system (in case of failure of a control system of the brake system).

1) When the control system of the hydraulic brake system is in failure, the supply of the electric current to the solenoids of all the electromagnetic valves is stopped so that all the electromagnetic valves are placed in the respective original positions as shown in FIG. 16. With the pump motor 55 being controlled, when a difference between the hydraulic pressure of the working fluid discharged from the pump 90 and the hydraulic pressure in the common passage 102 becomes larger than the valve opening pressure Pr of the relief valve 202, the working fluid discharged from the pump 90 is supplied to the common passage 102. The working fluid supplied to the common passage 102 is then supplied to the brake cylinder 42FL via the individual control valve 103FL that is being placed in the open state and also to the second pressurizing chamber 69b via the second master cut-off valve 134FL that is being placed in the open state. The hydraulic pressure in the first pressurizing chamber 69a is increased, and the working fluid is supplied to the brake cylinder 42FR.

Figure 17:
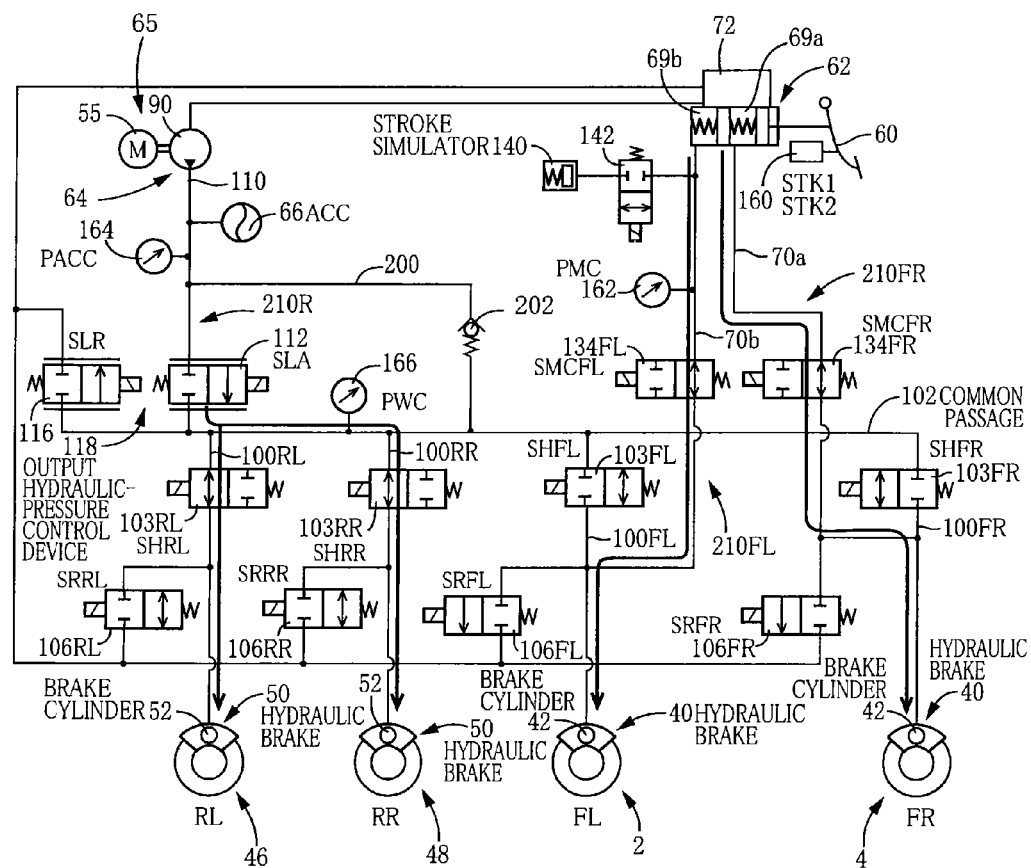
FIG. 17 is a view showing another state in the above-described hydraulic brake system (in case of presence of possibility of fluid leakage).

2) When it is detected that there is a possibility of fluid leakage, the electromagnetic valves are placed in respective positions as shown in FIG. 17. Like in the Embodiment 1, the pressure holding valves 103FL, 103FR are placed in the closed states, and the pressure reducing valves 106RL, 106RR are placed in the closed states. The hydraulic pressures are supplied from the pressurizing chambers 69b, 69a of the master cylinder 62 to the brake cylinders 42FL, 42FR provided for the front left and right wheels 2, 4, while the hydraulic pressure is supplied from the second hydraulic-pressure generating device 64 to the rear left and right wheels 46, 48.

Since the pressure holding valves 103FL, 103FR are placed in the closed states with the connection passage 200 being connected to the common passage 102, a brake line 210FL (including the brake cylinder 42FL provided for the front left wheel 2), a brake line 210FR (including the brake line 42FR provided for the front right wheel 4) and a brake line 210R (including the brake cylinders 52RL, 52RR provided for the rear left and right wheels 46, 48) are isolated from one another. Therefore, even if the fluid leakage occurs in any one of the three brake lines 210FL, 210FR, 210R, it is possible to satisfactorily avoid the other brake lines from being influenced by the fluid leakage occurring in the one of the brake lines.

Embodiment 5

Figure 18:
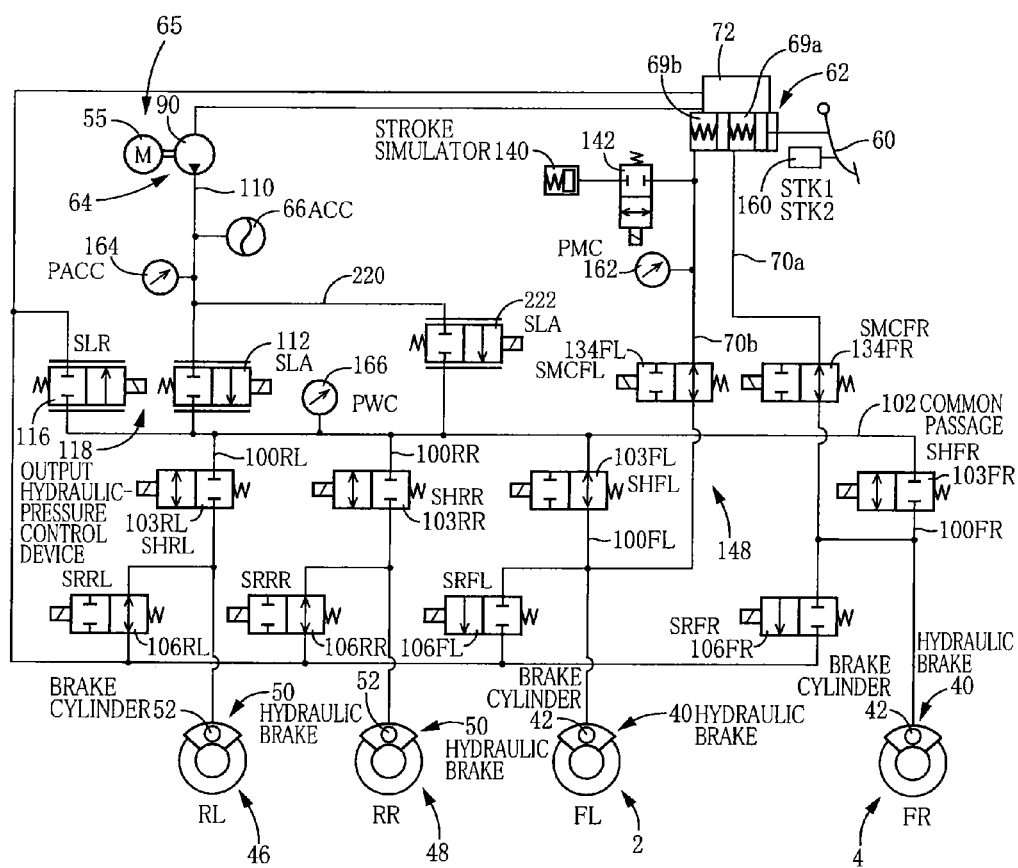
FIG. 18 is a view showing a diagram of a hydraulic circuit included in a hydraulic brake system according to an embodiment 5 of the present invention.

FIG. 18 shows a brake circuit of a hydraulic brake system according to embodiment 5.

In the present embodiment, the second hydraulic-pressure generating device 64 and the common passage 102 are connected through a connection passage 220. An electromagnetic valve 222 as a flow restraining device is disposed in a midway of the connection passage 220. The electromagnetic valve 222 and the pressure-increasing linear control valve 112 are disposed in parallel with each other between the second hydraulic-pressure generating device 64 and the common passage 102.

The electromagnetic valve 222 includes a valve body, a valve seat, a seating valve (including a spring) and a solenoid, and has substantially the same construction as that shown in FIG. 4A. The electromagnetic valve 222 is disposed to have such a posture that causes the hydraulic pressure of the second hydraulic-pressure generating device 64 to act on the valve body of the valve 222. When an electric current is not being supplied to the solenoid of the valve 222, the valve 222 is being placed in the closed state since the valve body is pressed onto the valve seat by a biasing force of the spring. Thus, when an electric current is not being supplied to the solenoid, the valve 222 serves as a relief valve. A setting pressure (valve opening pressure) of the valve 222 is dependent on a setting load of the spring of the spring 222, which is smaller than the setting load of the spring 124 of the pressure-increasing linear control valve 112 shown in FIG. 4A. The electromagnetic valve 222 may be either a linear control valve or a simple ON/OFF valve.

Where the valve 222 is a linear control valve, the valve 222 is capable of continuously controlling the hydraulic pressure in the common passage 102 by continuous control of an electric current supplied to the solenoid. In this case, during execution of the regenerative cooperative control, the electromagnetic valve 222 can be used in place of the pressure-increasing linear control valve 112. For example, it is possible to use a selected one of the pressure-increasing linear control valve 112 and the electromagnetic valve 222, which is selected, for example, in accordance with a predetermined rule, so that it is possible to reduce the number of times of use of the pressure-increasing linear control valve 112 and accordingly to prolong the service life of the valve 112. Further, where both of the pressure-increasing linear control valve 112 and the electromagnetic valve 222 are used, a flow rate of the working fluid supplied to the common passage 102 can be increased and accordingly a flow rate of the working fluid suppliable to the brake cylinders 42, 52 can be increased.

Where the valve 222 is a simple ON/OFF valve, the hydraulic pressure in the common passage 102 can be finely controlled by controlling a duty ratio of electric current supplied to the solenoid.

Embodiment 6

Figure 19:
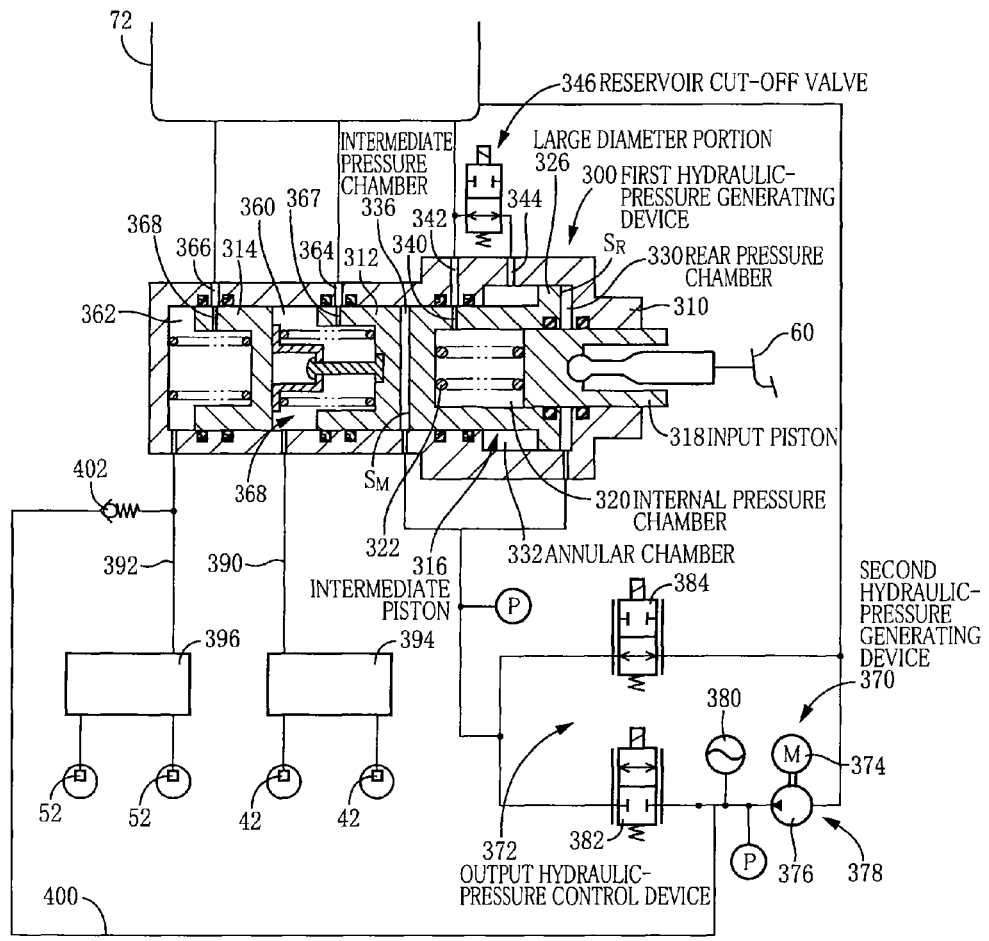
FIG. 19 is a view showing a diagram of a hydraulic circuit included in a hydraulic brake system according to an embodiment 6 of the present invention.

FIG. 19 shows a brake circuit of a hydraulic brake system according to Embodiment 6.

In the present embodiment, a first hydraulic-pressure generating device 300 includes a housing 310, first and second pressurizing pistons 312, 314, an intermediate piston 316 and an input piston 318. The pistons 312, 314, 316, 318 are fluid-tightly fitted in the housing 310, and are slidable relative to the housing 310 in the axial direction. The brake pedal 60 is linked to the input piston 318, such that the input piston 318 is movable forwardly when the brake pedal 60 is operated (for activating the hydraulic brakes 40, 50).

The intermediate piston 316 is constituted generally by a cylindrical-shaped member having a bottom wall. The input piston 318 is fitted in an inner circumferential surface of the intermediate piston 316, and is movable relative to the intermediate piston 316 in the axial direction. The intermediate piston 316 and the input piston 318 cooperate with each other to define an internal pressure chamber 320 therebetween. A spring 322 is interposed between the intermediate piston 316 and the input piston 318.

A stopper is disposed to limit movement of the intermediate piston 316 and the input piston 318 relative to each other. A forward end position and a rearward end position of the input piston 318 relative to the intermediate piston 316 are limited by the stopper.

The intermediate piston 316 is slidably fitted in a stepped cylinder bore that is defined in the housing 310. An annular-shaped large diameter portion (flange) 326 is provided to protrude outwardly from an outer circumferential surface of the intermediate piston 316, and is located in a large diameter portion of the cylinder bore. A rear pressure chamber 330 is defined on a rear side of the intermediate piston 316. An annular chamber 332 is defined by an intermediate portion of the intermediate piston 316. An intermediate pressure chamber 336 is defined between the intermediate piston 316 and the first pressurizing piston 312 that is located on a front side of the intermediate piston 316.

It is noted that an area SR of a pressure receiving surface of the intermediate piston 316 which faces the rear pressure chamber 330 and an area $S_M$ of a pressure receiving surface of the intermediate piston 316 which faces the intermediate pressure chamber 336 are equal to each other. Therefore, when the hydraulic pressure in the rear pressure chamber 330 and the hydraulic pressure in the intermediate pressure chamber 336 are equal to each other in magnitude, a force applied to the intermediate piston 316 from the hydraulic pressure in the rear pressure chamber 330 and a force applied to the intermediate piston 316 from the hydraulic pressure in the intermediate pressure chamber 336 are equal to each other in magnitude.

Further, when the intermediate piston 316 is being positioned in its rearward end position, a communication passage 340 formed in the intermediate piston 316 is positioned to be opposed to a reservoir port 342 formed in the housing 310 so that the internal pressure chamber 320 is brought into communication with the reservoir 72. In this state, the input piston 318 is allowed to be moved relative to the intermediate piston 316 in the axial direction, and a reaction force based on an elastic force of the spring 322 is applied to the input piston 318.

When the reservoir port 342 is closed by forward movement of the intermediate piston 316, the internal pressure chamber 320 is isolated from the reservoir 72 so that the input piston 318 is inhibited from being moved relative to the intermediate piston 316.

The annular chamber 332 is connected to the reservoir 72 via another reservoir port 344. Between the annular chamber 332 and the reservoir 72, there is disposed a reservoir cut-off valve 346 that is a normally-open electromagnetic valve. When the reservoir cut-off valve 346 is being placed in an open state, the annular chamber 332 is in communication with the reservoir 72 so that the intermediate piston 316 is allowed to be moved relative to the housing 310. When the reservoir cut-off valve 346 is being placed in a closed state, the annular chamber 332 is isolated from the reservoir 72 so that the intermediate piston 316 is inhibited from being moved relative to the housing 310.

A first pressurizing chamber 360 as a first manual hydraulic pressure source is located on a front side of the first pressurizing piston 312, while a second pressurizing chamber 362 as a second manual hydraulic pressure source is located on a front side of the second pressurizing piston 314. The housing 310 has reservoir ports 364, 366 while the first and second pressurizing pistons 312, 314 have respective communication holes 367, 368. When the first pressurizing piston 312 is located in its rearward end position, the reservoir port 364 and the communication hole 367 are in communication with each other whereby the first pressurizing chamber 360 is in communication with the reservoir 72. When the second pressurizing piston 314 is located in its rearward end position, the reservoir port 366 and the communication hole 368 are in communication with each other whereby the second pressurizing chamber 360 is in communication with the reservoir 72. The reservoir ports 364, 366 are closed by forward movements of the first and second pressurizing pistons 312, 314 whereby the first and second pressurizing chambers 360, 362 are isolated from the reservoir 72 so that hydraulic pressures are generated in the first and second pressurizing chambers 360, 362.

An extension limiting mechanism 368 is provided between the first and second pressurizing pistons 312, 314, so as to define a maximum distance between the first and second pressurizing pistons 312, 314.

A second hydraulic-pressure generating device 370 is connected to the rear pressure chamber 330 and the intermediate pressure chamber 336 via an output hydraulic-pressure control device 372.

The second hydraulic-pressure generating device 370 includes a pump device 378 and an accumulator 380. The pump device 378 as a power hydraulic pressure source has a pump motor 374 as a drive source and a pump 376 as a working-fluid supplying portion. The accumulator 380 is configured to retain the working fluid discharged from the pump 376 such that the retained working fluid is being pressurized. When the hydraulic brake system is normal, the pump motor 374 is controlled such that the hydraulic pressure of the working fluid retained in the accumulator 380 is held within a given range.

The output hydraulic-pressure control device 372 includes a pressure-increasing linear control valve 382 and a pressure-reducing linear control valve 384. The pressure-increasing linear control valve 382 has the same construction as the pressure-increasing linear control valve 112 in Embodiment 1, and is a normally-closed electromagnetic valve which is to be placed in a closed state when an electric current is not being supplied to a solenoid thereof. In the present embodiment, the pressure-reducing linear control valve 384 is a normally-open linear control valve which is to be placed in an open state when an electric current is not being supplied to a solenoid thereof, and which is capable of continuously controlling a pressure difference between hydraulic pressure on a high-pressure side of the valve 384 and hydraulic pressure on a low-pressure side of the valve 384, by continuous control of the electric current supplied to the solenoid. Since the valve 384 is a normally-open linear control valve, a reduction of the electric current supplied to the solenoid leads to a reduction of the pressure difference so that the pressure controlled by the valve 384 is reduced. When the electric current is not being supplied to the solenoids of the pressure-increasing linear control valve 382 and pressure-reducing linear control valve 384, the pressure-increasing linear control valve 382 is being placed in the closed state while the pressure-reducing linear control valve 384 is being placed in the open state, so that the intermediate pressure chamber 336 and the rear pressure chamber 330 are in communication with the reservoir 72.

Further, since the output hydraulic-pressure control device 372 is connected to both of the rear pressure chamber 330 and the intermediate pressure chamber 336, the hydraulic pressure in the rear pressure chamber 330 and the hydraulic pressure in the intermediate pressure chamber 336 are controlled to be equal to each other in magnitude.

First and second master cylinder passages 390, 392 are connected to the first and second pressurizing chambers 360, 362, respectively. The brake cylinders 42FL, 42FR provided for the front left and right wheels are connected to the first pressurizing chamber 360 through the first master cylinder passage 390. The brake cylinders 52RL, 52RR provided for the rear left and right wheels are connected to the second pressurizing chamber 362 through the second master cylinder passage 392. That is, in the present embodiment, there are two brake lines one of which is provided for the front wheels, and the other of which is provided for the rear wheels.

Further, in the present hydraulic brake system, slip control devices 394, 396 are provided such that the hydraulic pressures in the respective brake cylinders 42FL, 42FR, 52RL, 52RR are controlled independently of each other. The slip control device 394 includes a plurality of valves each of which is placeable in a pressure increasing state for bringing a corresponding one of the brake cylinders 42 and the first pressurizing chamber 360 into communication with each other, a pressure reducing state for bringing the corresponding brake cylinder 42 and the reservoir 72 into communication with each other, and a pressure holding state for isolating the corresponding brake cylinder 42 from the first pressurizing chamber 360 and the reservoir 72. Similarly, the slip control device 396 includes a plurality of valves each of which is placeable in a pressure increasing state for bringing a corresponding one of the brake cylinders 52 and the second pressurizing chamber 362 into communication with each other, a pressure reducing state for bringing the corresponding brake cylinder 52 and the reservoir 72 into communication with each other, and a pressure holding state for isolating the corresponding brake cylinder 52 from the second pressurizing chamber 362 and the reservoir 72.

Further, a connection passage 400 is provided to connect the second hydraulic-pressure generating device 370 and a connected portion of the second master cylinder passage 392, wherein the connected portion is located between the slip control device 396 (i.e., brake cylinders 52RL, 52RR) and the second pressurizing chamber 362. The connection passage 400 is provided with a relief valve 402 which is to be switched from its closed state to its open state when the hydraulic pressure in the second hydraulic-pressure generating device 370 becomes higher than the hydraulic pressure in the second master cylinder passage 392 by a given value Pr. With the relief valve 402 being placed in the open state, the working fluid is allowed to flow from the second hydraulic-pressure generating device 370 to the second master cylinder passage 392.

There will be described operations of the hydraulic brake system that is constructed as described above.

1) Regenerative Cooperative Control

When the hydraulic brake system is normal, the regenerative cooperative control is executed. With the reservoir cut-off valve 346 is being placed in the closed state, the hydraulic pressures in the first and second pressurizing chambers 360, 362 are controlled by control of the output hydraulic-pressure control device 372, such that the sum of the regenerative braking torque and the hydraulic pressure braking torque is equalized to the total required braking torque required by the vehicle operator.

The intermediate piston 316 is inhibited from being moved forwardly, by the placement of the reservoir cut-off valve 346 in the closed state. The input piston 318 is allowed to be movable relative to the intermediate piston 316, and receives a reaction force based on an elastic force of the spring 322 when the input piston 318 is moved forwardly relative to the intermediate piston 316.

At an initial stage of a braking operation, mostly, the total required braking torque can be obtained only by the regenerative braking torque. At such a stage, an electric current is not supplied to the solenoids of the pressure-increasing linear control valve 382 and the pressure-reducing linear control valve 384, so that the intermediate pressure chamber 336 and the rear pressure chamber 330 are in communication with the reservoir 72. Therefore, the hydraulic pressure is not generated in each of the first and second pressurizing chambers 360, 362. That is, the reaction force based on the elastic force of the spring 322 is applied to the brake pedal 60 that is being operated. Thus, the first hydraulic-pressure generating device 300 serves as a stroke simulator.

When the total required braking torque becomes larger than the regenerative braking torque, the hydraulic pressures in the rear pressure chamber 330 and the intermediate pressure chamber 336 are controlled by control of the output hydraulic-pressure control device 372. The force based on the rear pressure chamber 330 and acting on the intermediate piston 326 and the force based on the intermediate pressure chamber 336 and acting on the intermediate piston 326 are balanced with each other, so that the intermediate piston 326 is not moved. It is therefore possible to restrain change of an operation feeling given to the vehicle operator.

Further, owing to supply of the hydraulic pressure to the intermediate pressure chamber 336, the first pressurizing piston 312 is moved forwardly and then the second pressurizing piston 314 is moved forwardly, so that the magnitude of the hydraulic pressure in each of the first and second pressurizing chambers 360, 362 becomes dependent on the magnitude of the hydraulic pressure in the intermediate pressure chamber 336.

In other words, the hydraulic pressures in the brake cylinders 42, 52 are controlled by controlling the hydraulic pressure in the intermediate pressure chamber 336.

The hydraulic pressures in the brake cylinders 42, 52 can be controlled to be independent of the operating force applied to the brake pedal 60. The hydraulic pressures in the brake cylinders 42, 52 can be controlled to be smaller than magnitudes dependent on the operating force applied to the brake pedal 60 (i.e., magnitudes of the hydraulic pressures that are to be generated in the first and second pressurizing chambers 360, 362 when the input piston 318, intermediate piston 316 and first and second pressurizing pistons 312, 314 are moved forwardly integrally with one another).

The first hydraulic-pressure generating device 300 serves as a second-hydraulic-pressure-based hydraulic pressure generating device as well as the stroke simulator.

<In Case of Failure of Control System>

In case of failure of the control system of the hydraulic brake system, all the electromagnetic valves are placed back in the original positions, since electric current is not supplied to the solenoids of the electromagnetic valves. The rear pressure chamber 330, annular chamber 332 and intermediate pressure chamber 336 are brought into communication with the reservoir 72. Further, the internal pressure chamber 320 is brought into communication with the reservoir 72, with the intermediate piston 316 being positioned in the rearward end position.

By operation of the brake pedal 60, the input piston 318 is moved forwardly and then the intermediate piston 316 is moved forwardly. When the internal pressure chamber 320 becomes isolated from the reservoir 72 as a result of the forward movement of the intermediate piston 316, the intermediate piston 316 is moved forwardly integrally with the input piston 318.

After the intermediate piston 316 has been brought into contact with the first pressurizing piston 312, the first pressurizing piston 312 is moved forwardly and the second pressurizing piston 314 is moved forwardly whereby the hydraulic pressures are generated in the first and second pressurizing chambers 360, 362. The generated hydraulic pressures are supplied to the brake cylinders 42, 52 via the first and second master cylinder passages 390, 392, so as to activate the hydraulic brakes 40, 50.

Thus, in the case of failure of the control system, the first hydraulic-pressure generating device 300 serves as an ordinary tandem master cylinder The pump motor 374 is controlled in substantially the same manner as in Embodiment 1.

The working fluid discharged from the pump 376 is supplied via the relief valve 402 to the brake cylinders 52 and the second pressurizing chamber 362. Like in Embodiment 1, the hydraulic pressure in the second pressurizing chamber 362 is increased whereby the hydraulic pressure in the first pressurizing chamber 360 is increased and accordingly the hydraulic pressures in the brake cylinders 42 are increased.

Thus, in event of failure of the control system, the working fluid discharged from the pump 376 is supplied to the second pressurizing chamber 362 via the relief valve 402 whereby the hydraulic pressures in the brake cylinders 42, 52 can be increased. Further, owing to the provision of the accumulator 380, it is possible to restrain pulsation.

In the present embodiment, a manual-operation-associated brake line is constituted by components such as the second master cylinder passage 392, the first hydraulic-pressure generating device 300 and the brake cylinders 52RL, 52RR provided for the rear left and right wheels. Further, the pressure-increasing linear control valve 382 of the output hydraulic-pressure control device 372 is connected to the intermediate pressure chamber 336 that is located on a rear side of the pressurizing piston 312 of the first hydraulic-pressure generating device 300. In the present embodiment, the pressure-increasing linear control valve 382 and the relief valve 402 are disposed in parallel with each other between the manual-operation-associated brake line and the second hydraulic-pressure generating device 370.

While Embodiments 1-6 have been described, the present invention can be carried out by combining these Embodiments 1-6. For example, both of the relief valve and the electromagnetic valve may be disposed between the second hydraulic-pressure generating device and the manual-operation-associated brake line. Further, a flow restrictor or the like may be provided in addition to the relief valve and/or the electromagnetic valve.

Further, it is not essential that the second hydraulic-pressure generating device includes the accumulator.

Moreover, the output hydraulic-pressure control device 118 is not essential. The pressure-reducing linear control valve 116 is not essential, either. The hydraulic pressure in the common passage 102 can be controlled to be reduced by at least one of the pressure reducing valves 106.

In case of normality of the brake ECU 56, the hydraulic pressure outputted from the pump 90 can be controlled by the brake ECU 56 that controls the pump motor 55. In case of failure of the brake ECU 56 disabling control of the pump motor 55, the pump motor 55 may be controlled by the pump ECU 57 in a manner different from a manner in which the pump motor 55 is controlled by the brake ECU 56, such that the working fluid is supplied to the manual-operation-associated brake line via the flow restraining device.

Moreover, the present invention can be carried out in not only the above-described modes but also in other modes of various modifications and improvements that will be made based on knowledge of a person skilled in the art.

DESCRIPTION OF REFERENCE SIGNS 40, 50: hydraulic brake 42, 52: brake cylinder 54: hydraulic-pressure controlling portion 56: brake ECU 57: pump motor ECU 60: brake pedal 62: first hydraulic-pressure generating device 64: second hydraulic-pressure generating device 66: accumulator 100: individual passage 102: common passage 103: pressure holding valve 106: pressure reducing valve 110: controlled-pressure passage 112: pressure-increasing linear control valve 116: pressure-reducing linear control valve 118: output hydraulic-pressure control device 144: connection passage 146: relief valve 148: manual-operation-associated brake line 158: brake switch 160: stroke sensor 162: master-cylinder pressure sensor 164: accumulator pressure sensor 168: level warning 188: main electric power source 189: sub-electric power source 190: connection passage 192: relief valve 200: connection passage 202: relief valve 220: connection passage 222: linear control valve 300: first hydraulic-pressure generating device 312, 314: pressurizing piston 316: intermediate piston 318: input piston 330: rear pressure chamber 332: annular chamber 336: intermediate pressure chamber 346: reservoir cut-off valve 360, 362: first and second pressurizing chambers 370: second hydraulic-pressure generating device 372: output hydraulic-pressure control device 400: connection passage 402: relief valve

The invention claimed is:

1. A hydraulic brake system, comprising:
a first hydraulic-pressure generating device including a manual hydraulic pressure source which is configured to generate hydraulic pressure by operation of a brake operating member by an operator;
a second hydraulic-pressure generating device including a power hydraulic pressure source which is activatable by supply of electric energy thereto and which is configured to generate hydraulic pressure by activation thereof;
a plurality of hydraulic brakes provided for a plurality of wheels of a vehicle, and activatable by hydraulic pressures in respective brake cylinders thereof so as to restrain rotations of the respective wheels;
a manual-operation-associated brake line including (i) a communicating device which is communicable with said manual hydraulic pressure source and which is communicable at least one of said brake cylinders of said plurality of hydraulic brakes, (ii) said first hydraulic-pressure generating device, and (iii) said at least one of said brake cylinders;
an output hydraulic-pressure control device and a flow restraining device disposed in parallel with each other between said manual-operation-associated brake line and said second hydraulic-pressure generating device, said output hydraulic-pressure control device being configured to control the hydraulic pressure outputted from said second hydraulic-pressure generating device, said flow restraining device being configured to restrain flow of a working fluid away from said second hydraulic-pressure generating device toward said manual-operation-associated brake line;
a power hydraulic pressure source control device configured to activate said power hydraulic pressure source such that the hydraulic pressure is supplied from said power hydraulic pressure source to said manual-operation-associated brake line via said flow restraining device, when said hydraulic brake system is in a failure state disabling said output hydraulic-pressure control device from controlling the hydraulic pressure outputted by said second hydraulic-pressure generating device;
a front-wheel common passage to which said brake cylinders of said hydraulic brakes provided for respective front right and left wheels as ones of the plurality of wheels are connected via respective two front-wheel individual passages,
wherein said manual hydraulic pressure source is constituted by each of two pressurizing chambers of a tandem master cylinder which includes two pressurizing pistons and which is configured to generate the hydraulic pressures in said two pressurizing chambers by operation of said brake operating member, said two pressurizing chambers being connected to said respective two front-wheel individual passages via respective two front-wheel individual connection passages,
and wherein said communicating device includes (i) said front-wheel common passage, (ii) one of said two front-wheel individual passages, and (iii) one of said two front-wheel individual connection passages which is connected to said one of said two front-wheel individual passages;
a front-wheel individual control valve provided in said one of said two front-wheel individual passages, and constituted by a normally-open electromagnetic valve which is switchable between an open state and a closed state by control of supply of an electric current to a solenoid thereof and which is to be placed in the open state when the electric current is not being supplied to the solenoid thereof; and
another from-wheel individual control valve provided in another one of said two front-wheel individual passages, and constituted by a normally-closed electromagnetic valve which is switchable between an open state and a closed state by control of supply of an electric current to a solenoid thereof and which is to be placed in the closed state when the electric current is not being supplied to the solenoid thereof,
wherein said one of said two front-wheel individual connection passages is connected to a portion of said one of said two front-wheel individual passages which is located on a downstream side of said front-wheel individual control valve constituted by said normally-open electromagnetic valve, while another one of said two front-wheel individual connection passages is connected to a portion of said another one of said two front-wheel individual passages which is located on a downstream side of said another front-wheel individual control valve constituted by said normally-closed electromagnetic valve.

2. The hydraulic brake system according to claim 1, comprising manual-passage cut-off valves each of which is provided in a corresponding one of said two front-wheel individual connection passages and each of which is a normally-open electromagnetic valve that is to be placed in an open state when the electric current is not being supplied to a solenoid thereof.

3. The hydraulic brake system according to claim 1, further comprising:
a controlling portion configured to control said electromagnetic valve based on an operational state of said brake operating member such that the hydraulic pressures in said brake cylinders are controlled to required hydraulic pressures that are determined based on an operational state of said brake operating member,
wherein said power hydraulic pressure source control device is configured to activate said power hydraulic pressure source such that the hydraulic pressure is supplied from said power hydraulic pressure source to said manual-operation-associated brake line via said flow restraining device, when the hydraulic pressure outputted from said second hydraulic-pressure generating device is uncontrollable due to failure of at least one of said electromagnetic valve and said controlling portion.

4. The hydraulic brake system according to claim 3,
wherein said power hydraulic pressure source includes an electric motor as a drive source and a pump that is to be activated by said electric motor,
and wherein said power hydraulic pressure source control device is configured to activate said electric motor when the hydraulic pressure outputted from said second hydraulic-pressure generating device is uncontrollable due to the failure of said at least one of said electromagnetic valve and said controlling portion.

5. The hydraulic brake system according to claim 3,
wherein said power hydraulic pressure source control device is configured to activate said power hydraulic pressure source such that the hydraulic pressure is supplied from said power hydraulic pressure source to said manual-operation-associated brake line via said flow restraining device, when said hydraulic brake system is in a failure state disabling said output hydraulic-pressure control device from controlling the hydraulic pressure outputted by said second hydraulic-pressure generating device while said brake operating member is being operated and said electromagnetic valve is in a closed state.

6. The hydraulic brake system according to claim 3,
wherein said communicating device includes a manual passage connecting one of said two pressurizing chambers and one of said brake cylinders of said hydraulic brakes provided for respective front right and left wheels,
wherein said manual passage is constituted by said one of said two front-wheel individual connection passages and a portion of said one of said two front-wheel individual passages which portion is closer to said one of said brake cylinders of said hydraulic brakes provided for respective front right and left wheels than said portion of said one of said two front-wheel individual passages which is connected to said one of said two front-wheel individual connection passages,
and wherein said flow restraining device is disposed between said second hydraulic-pressure generating device and said manual passage.

7. The hydraulic brake system according to claim 6, further comprising a manual-passage cut-off valve which is provided in said manual passage and which is an electromagnetic valve switchable between at least an open state and a closed state by control of supply of an electric current to a solenoid thereof,
wherein said flow restraining device is disposed between said second hydraulic-pressure generating device and a portion of said manual passage, said portion of said manual passage being closer to said at least one of said brake cylinders than said manual-passage cut-off valve.

8. The hydraulic brake system according to claim 6,
wherein said flow restraining device is disposed between said second hydraulic-pressure generating device and said manual passage, and another one of said two pressurizing chambers is provided with a movement limiting portion that is configured to limit movements of said two pressurizing pistons relative to each other.

9. The hydraulic brake system according to claim 3,
wherein said flow restraining device is disposed between said second hydraulic-pressure generating device and said front-wheel common passage.

10. The hydraulic brake system according to claim 3,
wherein said output hydraulic-pressure control device is disposed between said second hydraulic-pressure generating device and said front-wheel common passage.

11. The hydraulic brake system according to claim 3,
wherein said output hydraulic-pressure control device includes a linear control valve that is configured to control a difference between hydraulic pressure on a high-pressure side of said linear control valve and hydraulic pressure on a low-pressure side of said linear control valve by control of supply of an electric current to a solenoid thereof.

12. The hydraulic brake system according to claim 3,
wherein said flow restraining device includes a relief valve that is configured to allow flow of the working fluid away from said second hydraulic-pressure generating device toward said manual-operation-associated brake line when the hydraulic pressure in said second hydraulic-pressure generating device is higher than the hydraulic pressure in said manual-operation-associated brake line by at least a given value.

13. The hydraulic brake system according to claim 3,
wherein said flow restraining device includes a normally-closed electromagnetic valve which is switchable between at least an open state and a closed state by control of supply of an electric current to a solenoid thereof and which is to be placed in the closed state when the electric current is not being supplied to the solenoid thereof.

14. The hydraulic brake system according to claim 3,
wherein said power hydraulic pressure source includes (i) a drive source and (ii) a working-fluid supplying portion which is to be activated by said drive source for thereby supplying the working fluid,
and wherein said second hydraulic-pressure generating device includes an accumulator configured to retain the working fluid supplied from said working-fluid supplying portion such that the retained working fluid is being pressurized.

15. The hydraulic brake system according to claim 3,
wherein said one of said front-wheel individual connection passages is connected to one of said two pressurizing chambers, and wherein another one of said two pressurizing chambers is provided with a movement limiting portion that is configured to limit movements of said two pressurizing pistons.

16. The hydraulic brake system according to claim 3, wherein said flow restraining device includes an electromagnetic valve that is disposed between said second hydraulic-pressure generating device and said front-wheel common passage.

* * * * *